(12) United States Patent
Tazume

(10) Patent No.: US 11,986,114 B2
(45) Date of Patent: May 21, 2024

(54) DELIVERY SYSTEM, CONTROL DEVICE, DELIVERY METHOD, AND CONTROL METHOD

(71) Applicant: Rakuten Group, Inc., Tokyo (JP)

(72) Inventor: Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 752 days.

(21) Appl. No.: 17/055,824

(22) PCT Filed: Mar. 11, 2019

(86) PCT No.: PCT/JP2019/009637
§ 371 (c)(1),
(2) Date: Nov. 16, 2020

(87) PCT Pub. No.: WO2020/183557
PCT Pub. Date: Sep. 17, 2020

(65) Prior Publication Data
US 2021/0228010 A1    Jul. 29, 2021

(51) Int. Cl.
*G05D 1/00* (2006.01)
*A47G 29/124* (2006.01)

(52) U.S. Cl.
CPC ......... *A47G 29/124* (2013.01); *G05D 1/0088* (2013.01); *G05D 1/0219* (2013.01); *G05D 1/0225* (2013.01)

(58) Field of Classification Search
CPC ............... G05D 1/0088; G05D 1/0225; A47G 2029/145; A47G 2029/146; H04W 4/80; H04W 12/06; H04W 12/63; G06Q 10/083
See application file for complete search history.

(56) References Cited

U.S. PATENT DOCUMENTS 5,179,329 A * 1/1993 Nishikawa ........... G05D 1/0297
318/587
8,682,486 B2 * 3/2014 Wang .................... B25J 9/1697
700/262

(Continued)

FOREIGN PATENT DOCUMENTS

CN        103492651 A  *  1/2014   ............ E04H 6/225
CN        105046835 A     11/2015

(Continued)

OTHER PUBLICATIONS

"Wireless vehicular networks to support road haulage and port operations in a multimodal logistics environment;" Coronado et al.; 2008 IEEE International Conference on Service Operations and Logistics, and Informatics (vol. 1, pp. 550-555); Feb. 9, 2009. (Year: 2009).*

(Continued)

*Primary Examiner* — Khoi H Tran
*Assistant Examiner* — Jorge O Peche
(74) *Attorney, Agent, or Firm* — Sughrue Mion, PLLC

(57) ABSTRACT

A delivery system S performs authenticating process of authenticating at least any one of an UGV 1 and an article delivered by the UGV 1 in a case where the UGV 1 arrives at a delivery destination, and performs opening/closing control of a first carry-in port from which the article is carried in at the delivery destination on the basis of the authentication result of the UGV 1 or the article delivered by the UGV 1.

14 Claims, 12 Drawing Sheets

(56) References Cited

U.S. PATENT DOCUMENTS

| | | | | |
|---|---|---|---|---|
| 9,412,280 | B1* | 8/2016 | Zwillinger | G06Q 10/083 |
| 9,471,062 | B1* | 10/2016 | Theobald | G05D 1/021 |
| 10,026,054 | B1* | 7/2018 | Staton | B64C 39/024 |
| 10,413,106 | B1* | 9/2019 | Valeriano | A47G 29/141 |
| 10,512,351 | B1* | 12/2019 | Valeriano | E05B 47/0001 |
| 10,532,885 | B1* | 1/2020 | Brady | G05D 1/0022 |
| 10,583,922 | B1* | 3/2020 | Boyes | B64U 50/39 |
| 10,717,524 | B1* | 7/2020 | Boyes | B64D 43/00 |
| 10,746,348 | B2* | 8/2020 | Strahlendorf | F16M 11/18 |
| 10,839,336 | B2* | 11/2020 | Greiner | B64D 1/02 |
| 11,100,745 | B2* | 8/2021 | Yamato | G07F 17/14 |
| 11,176,630 | B2* | 11/2021 | Prager | G06Q 10/0833 |
| 11,242,231 | B1* | 2/2022 | Kashwa | B66F 7/065 |
| 11,250,652 | B2* | 2/2022 | Sengstaken, Jr. | G06K 7/10366 |
| 11,259,663 | B2* | 3/2022 | Gil | B64F 1/32 |
| 11,400,596 | B2* | 8/2022 | Liivik | G06Q 50/40 |
| 11,497,335 | B2* | 11/2022 | Romanucci | A47G 29/30 |
| 11,656,633 | B2* | 5/2023 | Tazume | B64U 10/13 701/1 |
| 11,767,111 | B1* | 9/2023 | Blake | B64C 1/1415 244/17.11 |
| 2012/0109760 | A1* | 5/2012 | Koiso | G06Q 50/12 705/15 |
| 2014/0032034 | A1* | 1/2014 | Raptopoulos | H04B 7/18506 701/25 |
| 2014/0136414 | A1* | 5/2014 | Abhyanker | G05D 1/0011 701/25 |
| 2015/0183528 | A1* | 7/2015 | Walsh | A47G 29/141 244/114 R |
| 2015/0370253 | A1* | 12/2015 | Gurin | H04N 7/185 701/1 |
| 2016/0235236 | A1* | 8/2016 | Byers | A47G 29/14 |
| 2016/0239803 | A1* | 8/2016 | Borley | G06Q 10/08355 |
| 2016/0275735 | A1* | 9/2016 | Carstens | E05B 65/5246 |
| 2017/0147975 | A1* | 5/2017 | Natarajan | H04L 63/0876 |
| 2017/0213187 | A1* | 7/2017 | Choi | H04N 7/181 |
| 2018/0059659 | A1* | 3/2018 | Takeuchi | G06Q 10/083 |
| 2018/0075688 | A1 | 3/2018 | Liu | |
| 2018/0092484 | A1* | 4/2018 | Lewis | G08G 5/0026 |
| 2018/0144285 | A1* | 5/2018 | Hoffman | B65G 47/44 |
| 2018/0330325 | A1* | 11/2018 | Sibley | B25J 5/007 |
| 2019/0019141 | A1* | 1/2019 | Torii | H04W 12/08 |
| 2019/0034858 | A1* | 1/2019 | Ferguson | G05D 1/0276 |
| 2019/0049988 | A1* | 2/2019 | Meij | G05D 1/0274 |
| 2019/0215673 | A1* | 7/2019 | Choi | H04L 47/20 |
| 2019/0231106 | A1* | 8/2019 | Kaiserman | F25D 23/10 |
| 2019/0287062 | A1* | 9/2019 | Skaaksrud | G16H 40/20 |
| 2020/0050200 | A1* | 2/2020 | Torii | B64C 39/024 |
| 2020/0130510 | A1* | 4/2020 | Eck | G06Q 10/0836 |
| 2020/0154922 | A1* | 5/2020 | Jeffs | A47G 29/28 |
| 2020/0223397 | A1* | 7/2020 | Sakai | G06V 20/56 |
| 2020/0279217 | A1* | 9/2020 | Gravelle | H04W 4/40 |
| 2021/0076847 | A1* | 3/2021 | Huffar | G06Q 20/18 |
| 2021/0099439 | A1* | 4/2021 | Hassani | H04W 4/48 |
| 2021/0228010 | A1* | 7/2021 | Tazume | A47G 29/141 |
| 2021/0316027 | A1* | 10/2021 | O'Keefe | A61L 2/22 |
| 2021/0317697 | A1* | 10/2021 | Tulsidas | G06V 40/40 |
| 2022/0250768 | A1* | 8/2022 | Oshima | B64D 1/02 |
| 2023/0084439 | A1* | 3/2023 | Oshima | B66F 19/00 244/17.23 |
| 2023/0115325 | A1* | 4/2023 | Thorp | G07F 17/12 340/5.73 |
| 2023/0127977 | A1* | 4/2023 | Haskin | B60W 60/0016 340/5.72 |
| 2023/0144456 | A1* | 5/2023 | Ferguson | G06Q 20/401 705/26.81 |
| 2023/0237426 | A1* | 7/2023 | Ton | G06Q 10/083 705/339 |
| 2024/0017814 | A1* | 1/2024 | Blake | B64C 1/1415 |
| 2024/0017825 | A1* | 1/2024 | Blake | B64D 9/003 |
| 2024/0017827 | A1* | 1/2024 | Blake | B64D 1/10 |

FOREIGN PATENT DOCUMENTS

| | | | | |
|---|---|---|---|---|
| CN | 106203929 | A | * | 12/2016 |
| CN | 106605252 | A | * | 4/2017 ... B64C 39/024 |
| CN | 106663380 | A | * | 5/2017 ... A47G 29/122 |
| CN | 107408352 | A | * | 11/2017 ... B64C 39/024 |
| CN | 109071015 | A | * | 12/2018 ... B60P 3/11 |
| CN | 111242526 | A | * | 6/2020 ... B64C 39/024 |
| CN | 111754170 | A | * | 10/2020 ... G06Q 10/083 |
| CN | 106164946 | B | * | 6/2021 ... A47G 29/14 |
| CN | 216003992 | U | * | 3/2022 |
| EP | 2 397 051 | A1 | | 12/2011 |
| EP | 4113414 | A1 | * | 1/2023 ... G06F 21/32 |
| FR | 3046284 | A1 | * | 6/2017 |
| JP | 2016-113291 | A | | 6/2016 |
| JP | 2017020259 | A | * | 1/2017 |
| JP | 2018032282 | A | * | 3/2018 ... B60W 30/0956 |
| JP | 2018-515296 | A | | 6/2018 |
| JP | 2018-148992 | A | | 9/2018 |
| JP | 2018-151923 | A | | 9/2018 |
| JP | 2019044364 | A | * | 3/2019 |
| JP | 2019507075 | A | * | 3/2019 |
| KR | 20210087309 | A | * | 7/2021 |
| TW | I596567 | B | * | 8/2017 |
| WO | WO-2015072230 | A1 | * | 5/2015 ... B60J 5/00 |
| WO | WO-2017115446 | A1 | * | 7/2017 ... B64C 27/08 |
| WO | WO-2019087432 | A1 | * | 5/2019 ... B60W 40/09 |

OTHER PUBLICATIONS

"A decentralized hybrid computing consumer authentication framework for a reliable drone delivery as a service;" Hannan et al., PloS ONE, 16(4), e0250737; Apr. 30, 2021. (Year: 2021).*

"OTP Based Authentication Model for Autonomous Delivery Systems Using Raspberry Pi;" Rani et al.; 2022 International Conference on Intelligent Controller and Computing for Smart Power (ICICCSP) (pp. 1-5); Jul. 21, 2022. (Year: 2022).*

"Modeling Method Of Integrated Unmanned Warehouse System Based On Flexsim;" Li et al., 2020 7th International Conference on Information Science and Control Engineering (ICISCE) (pp. 851-855); Dec. 1, 2020. (Year: 2020).*

International Search Report of PCT/JP2019/009637 dated Jun. 11, 2019 [PCT/ISA/210].

* cited by examiner

FIG. 2
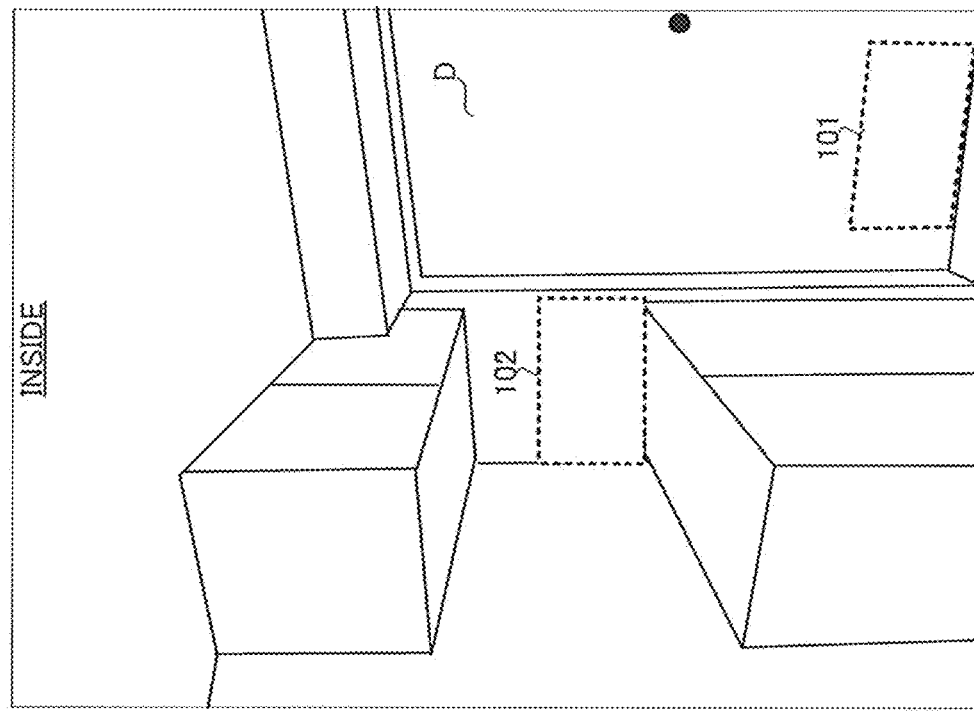
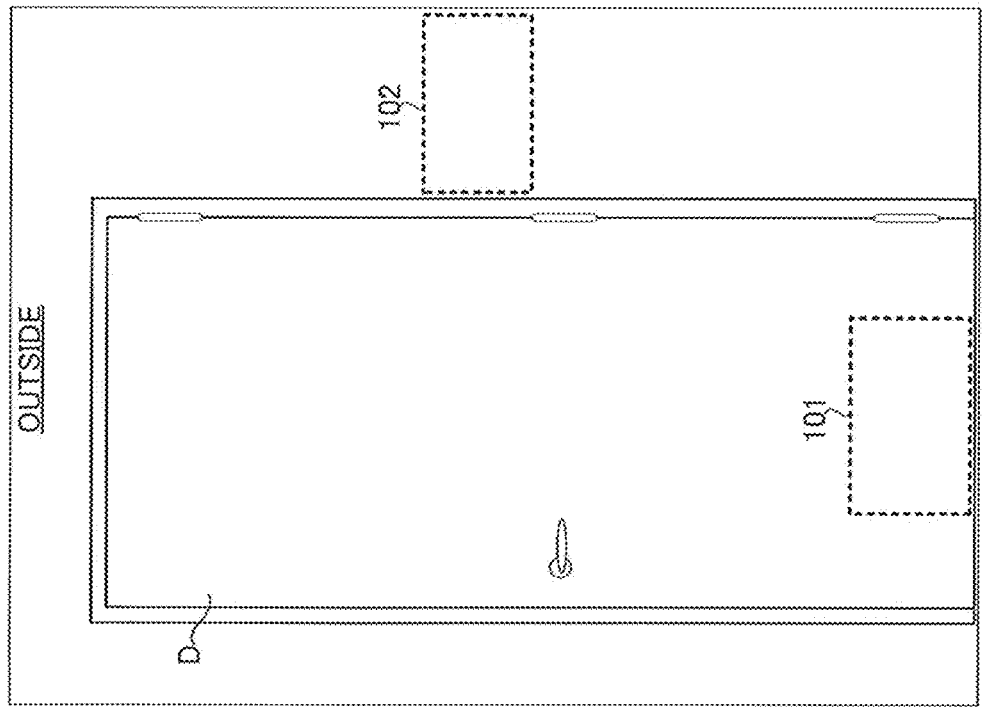

FIG. 6
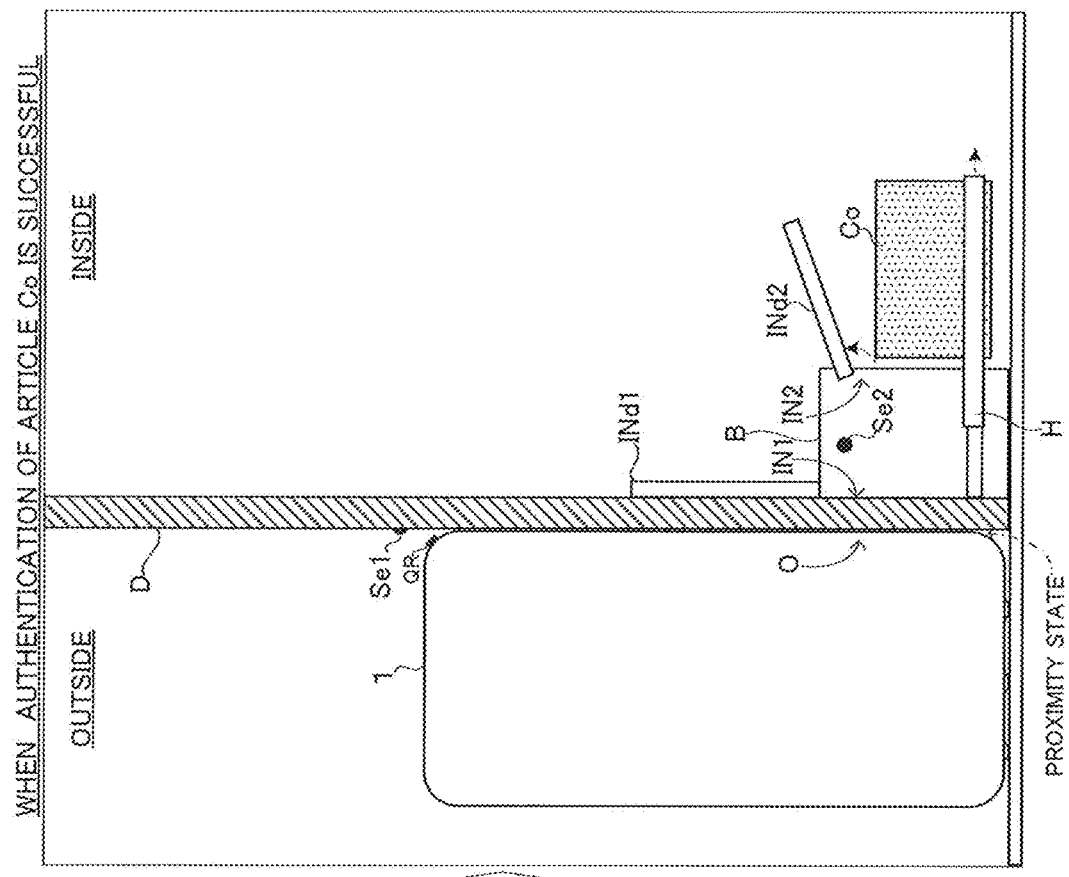
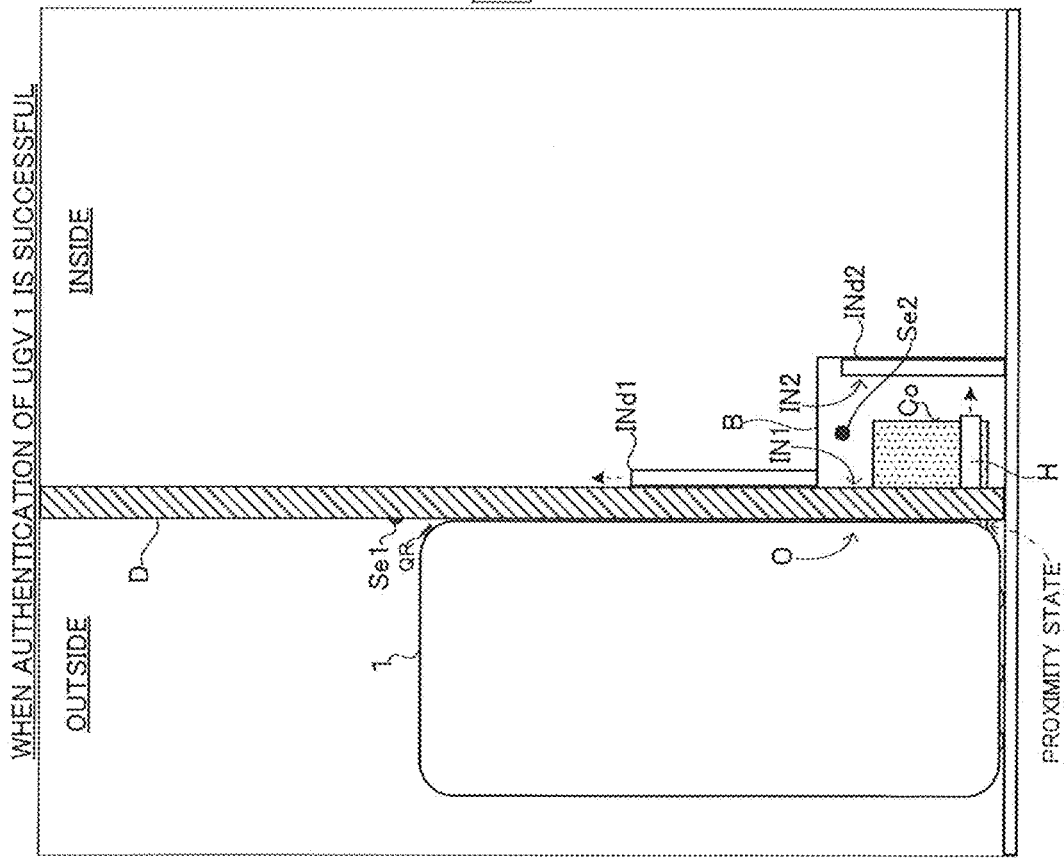

DELIVERY SYSTEM, CONTROL DEVICE, DELIVERY METHOD, AND CONTROL METHOD

CROSS REFERENCE TO RELATED APPLICATIONS

This application is a National Stage of International Application No. PCT/JP2019/009637 filed on Mar. 11, 2019.

TECHNICAL FIELD

The present invention relates to a technical field of a delivery system and the like including an unmanned mobile vehicle that delivers an article to a delivery destination.

BACKGROUND ART

Conventionally, it is studied to use an unmanned mobile vehicle such as an unmanned ground car to deliver an article unmanned to a delivery destination such as a home. For example, in a hotel and the like, an unmanned delivery service is already performed such that an unmanned mobile vehicle carries an article to a guest room, and when a recipient of the article (guest) removes the article from the unmanned mobile vehicle, the unmanned mobile vehicle returns. In this manner, in the unmanned delivery service in which the recipient of the article receives the article directly from the unmanned mobile vehicle, it is necessary to arrange for re-delivery in a case where the recipient is absent, or to execute the delivery after checking that the recipient is not absent. Therefore, recently, a technology capable of performing unmanned delivery of the article to the delivery destination even when the recipient of the article is absent is studied. For example, Patent Literature 1 discloses a delivery robot that delivers a product to a storage provided at a boundary between the inside and the outside of a customer's home regardless of whether the customer is at home.

CITATION LIST

Patent Literature

Patent Literature 1: JP 2018-151923 A

SUMMARY OF INVENTION

Technical Problem

However, in the above-described technology, security is not taken into account, and there is a possibility that an unmanned mobile vehicle or a person not intended by the recipient of the article may access a storage connected to the inside of the home, for example.

Therefore, one or more embodiments of the present invention are directed to provide a delivery system, a control device, a delivery method, and a control method capable of delivering an article to a delivery destination by an unmanned mobile vehicle while ensuring security.

Solution to Problem

In response to the above issue, the invention according to claim 1 is a delivery system including an unmanned mobile vehicle that delivers an article to a delivery destination. The delivery system includes: an authenticating processing unit that performs a process of authenticating at least any one of the unmanned mobile vehicle and the article delivered by the unmanned mobile vehicle in a case where the unmanned mobile vehicle arrives at the delivery destination; and an opening/closing control unit that performs opening/closing control of a first carry-in port from which the article is carried in at the delivery destination on the basis of an authentication result of at least any one of the unmanned mobile vehicle and the article. This makes it possible to deliver the article to the delivery destination by the unmanned mobile vehicle while ensuring security.

The invention according to claim 2 is the delivery system according to claim 1, wherein the authenticating processing unit performs the process of authenticating the unmanned mobile vehicle in a case where the unmanned mobile vehicle arrives at the delivery destination, and the opening/closing control unit performs the opening/closing control of the first carry-in port from which the article is carried in at the delivery destination on the basis of the authentication result of the unmanned mobile vehicle. This makes it possible to deliver the article to the delivery destination by the unmanned mobile vehicle while ensuring security.

The invention according to claim 3 is the delivery system according to claim 1 or 2 further including a detection unit that detects a state in which the unmanned mobile vehicle is close to the first carry-in port, wherein the authenticating processing unit performs the process of authenticating the unmanned mobile vehicle only in a case where the detection unit detects the state in which the unmanned mobile vehicle and the first carry-in port are close to each other. This makes it possible to further improve the security when the article is carried in from the first carry-in port by the unmanned mobile vehicle.

The invention according to claim 4 is the delivery system according to claim 1 or 2, further including a detection unit that detects a state in which the unmanned mobile vehicle is close to the first carry-in port, wherein the authenticating processing unit determines that the authentication result is authentication failure in a case of performing the process of authenticating the unmanned mobile vehicle when the detection unit does not detect the state in which the unmanned mobile vehicle and the first carry-in port are close to each other. This makes it possible to further improve the security when the article is carried in from the first carry-in port by the unmanned mobile vehicle.

The invention according to claim 5 is the delivery system according to any one of claims 1 to 4, wherein the authenticating processing unit performs the process of authenticating the unmanned mobile vehicle as a first step. The delivery system further includes a carrying-in control unit that performs carrying-in control of carrying the article in from the first carry-in port opened by the opening/closing control on the basis of the authentication result of the unmanned mobile vehicle, wherein the authenticating processing unit performs the process of authenticating the article carried in from the first carry-in port by the carrying-in control as a second step, and the opening/closing control unit performs opening/closing control of a second carry-in port from which the article carried in from the first carry-in port is further carried in on the basis of the authentication result of the article. This makes it possible to further improve the security when the article is carried in from the second carry-in port through the first carry-in port by the unmanned mobile vehicle.

The invention according to claim 6 is the delivery system according to claim 5, wherein a sensor that obtains information used for authenticating the article from the article carried in from the first carry-in port is provided between the first carry-in port and the second carry-in port. This makes it possible to perform the process of authenticating the article only in a case where the article is carried in from the first carry-in port on the basis of the authentication result of the unmanned mobile vehicle.

The invention according to claim 7 is the delivery system according to claim 5 or 6 further including a return control unit that performs return control of returning the article carried in from the first carry-in port by the carrying-in control to the unmanned mobile vehicle in a case where the authentication result of the article is authentication failure. This makes it possible to prevent the recipient from unintentionally receiving an unrecognized article.

The invention according to claim 8 is the delivery system according to claim 5 or 6 further including: a notice processing unit that issues an inquiry notice of receivability of the article to a recipient of the article in a case where the authentication result of the article is authentication failure; and a receivability information reception unit that receives receivability information indicating the receivability selected by the recipient in response to the inquiry notice from a terminal of the recipient, wherein the opening/closing control unit performs the opening/closing control of the second carry-in port on the basis of the receivability information received by the receivability information reception unit. Thus, even if the recipient does not recognize the article, the article can be carried in from the carry-in port in accordance with permission of the recipient, so that efficiency of article delivery may be improved.

The invention according to claim 9 is the delivery system according to any one of claims 1 to 8 further including: a sensor that obtains information used for authenticating the article from the article delivered to the delivery destination by the unmanned mobile vehicle; and an order information management unit that manages order information of the article ordered for purchase, wherein the authenticating processing unit performs the process of authenticating the article using the information obtained by the sensor and the order information managed by the order information management unit. This makes it possible to prevent the recipient from unintentionally receiving an unrecognized article.

The invention according to claim 10 is the delivery system according to any one of claims 1 to 9, wherein the first carry-in port is provided at a boundary between an outside and an inside of a building or at a boundary between an outside and an inside of a room in the building, and serves as an opening enabling access from the outside to the inside.

The invention according to claim 11 is the delivery system according to any one of claims 1 to 10, wherein the delivery destination is at least any one of housing, an office, each section of collective housing, and each guest room of an accommodation facility.

The invention according to claim 12 is a delivery method executed by a delivery system including an unmanned mobile vehicle that delivers an article to a delivery destination. The delivery method includes: a step of performing a process of authenticating at least any one of the unmanned mobile vehicle and the article delivered by the unmanned mobile vehicle in a case where the unmanned mobile vehicle arrives at the delivery destination; and a step of performing opening/closing control of a first carry-in port from which the article is carried in at the delivery destination on the basis of an authentication result of the unmanned mobile vehicle or the article.

The invention according to claim 13 is a control device provided on an unmanned mobile vehicle, the control device including: a movement control unit that performs movement control of moving the unmanned mobile vehicle to a delivery destination of an article; and a carrying-in control unit that performs carrying-in control of carrying the article in from a first carry-in port opened on the basis of an authentication result of at least any one of the unmanned mobile vehicle that arrives at the delivery destination and the article delivered by the unmanned mobile vehicle.

The invention according to claim 14 is the control device according to claim 13, wherein the movement control unit performs the movement control such that the unmanned mobile vehicle that arrives at the delivery destination comes close to the first carry-in port and a carry-out port and the first carry-in port face each other, the carry-out port being provided on the unmanned mobile vehicle.

The invention according to claim 15 is a control method executed by a computer provided on an unmanned mobile vehicle. The control method includes: a step of performing movement control of moving the unmanned mobile vehicle to a delivery destination of an article; and a step of performing carrying-in control of carrying the article in from a first carry-in port opened on the basis of an authentication result of at least any one of the unmanned mobile vehicle that arrives at the delivery destination and the article delivered by the unmanned mobile vehicle.

Advantageous Effect of the Invention

According to one or more embodiments of the present invention, it is possible to deliver the article to the delivery destination by the unmanned mobile vehicle while ensuring security.

BRIEF DESCRIPTION OF DRAWINGS

FIG. 2 is a view illustrating an example of an installation position of a carry-in port IN1.

FIG. 6 is a view illustrating states when an article Co is carried out from a carry-out port O and carried in from a carry-in ports IN1 and IN2.

DESCRIPTION OF EMBODIMENTS

Hereinafter, an embodiment of a delivery system according to an embodiment of the present invention and a delivery method executed by the delivery system is described with reference to the drawings.

[1. Configuration and Functional Outline of Delivery System S]

Figure 1:
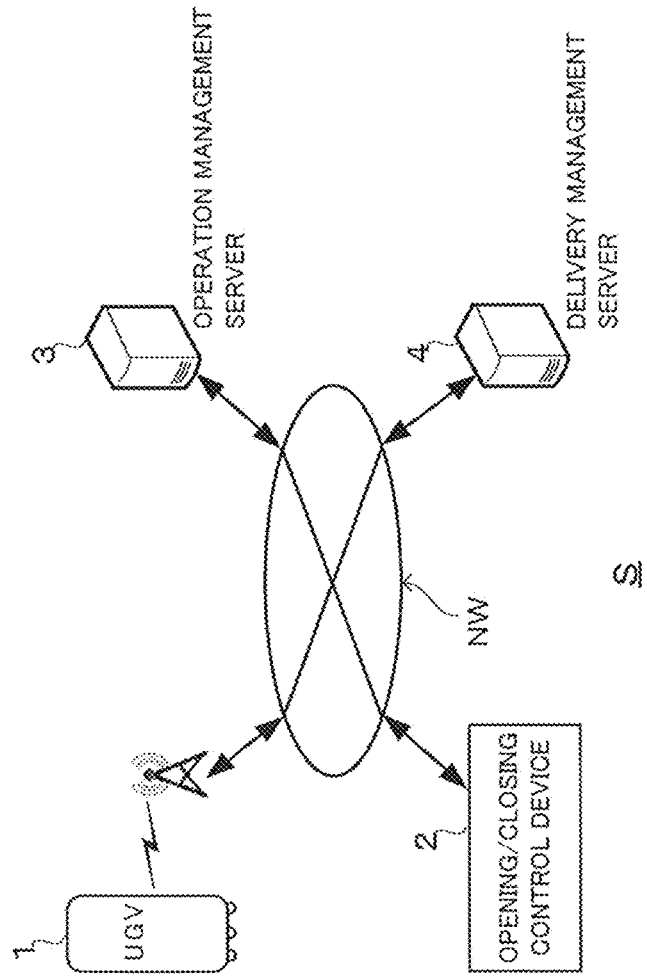
FIG. 1 is diagram illustrating a schematic configuration example of a delivery system S.

First, a configuration and a functional outline of a delivery system S according to this embodiment are described with reference to FIG. 1. FIG. 1 is a diagram illustrating a schematic configuration example of the delivery system S. As illustrated in FIG. 1, the delivery system S includes an unmanned ground vehicle (hereinafter, referred to as a "UGV (Unmanned Ground Vehicle)") 1 that delivers an article to a delivery destination, an opening/closing control device 2 that performs opening/closing control of first and second carry-in ports from which the article is carried in at the delivery destination, an operation management server 3 that performs operation management and the like of the UGV 1, a delivery management server 4 that performs delivery management of the article and the like, and the like. Incidentally, in the example in FIG. 1, although one UGV 1 and one opening/closing control device 2 are illustrated, there actually are a plurality of UGVs 1 and a plurality of opening/closing control devices 2. The opening/closing control device 2 is installed, for example, for each building or each room in the building. The UGV 1 and the opening/closing control device 2 may communicate with the operation management server 3 and the delivery management server 4 via a communication network NW. The communication network NW is formed of, for example, the Internet, a mobile body communication network, a radio base station thereof, and the like. Radio communication is performed between the radio base station and the UGV 1. The opening/closing control device 2 may perform short-range wireless communication (for example, short-range wireless communication based on Bluetooth (registered trademark) standards) with the UGV 1. Incidentally, although the UGV 1 illustrated in FIG. 1 represents an unmanned ground car including a plurality of wheels for moving on the ground, the UGV 1 may also be a robot without wheels (for example, a bipedal walking robot). In the following description, the first carry-in port is referred to as a carry-in port IN1, and the second carry-in port is referred to as a carry-in port IN2.

In such delivery system S, the UGV 1 into which the article to be delivered (hereinafter, referred to as an "article Co") is loaded moves on the ground on the basis of delivery destination information provided from the delivery management server 4, for example, to deliver the article Co to the delivery destination. Then, in a case where the UGV 1 arrives at the delivery destination, an authenticating process of authenticating at least any one of the UGV 1 and the article Co is performed. Herein, in the authenticating process, a vehicle ID (UGVID) obtained from the UGV 1 or an article ID obtained from the article Co is used. The vehicle ID is identification information for identifying the UGV 1, the information used for authenticating the UGV 1. The article ID is identification information for identifying the article Co, the information used for authenticating the article Co. In a case where the article Co is a product ordered for purchase by a recipient, an order ID for identifying the order may be used for authenticating the article Co in place of the article ID. The authenticating process of authenticating the UGV 1 is performed by the opening/closing control device 2 or the operation management server 3. Incidentally, the authenticating process of authenticating the UGV 1 is desirably performed in a state in which the UGV 1 and the carry-in port IN1 are close to each other. In contrast, the authenticating process of authenticating the article Co is performed by the opening/closing control device 2 or the delivery management server 4. An authentication result of at least any one of the UGV 1 and the article Co is authentication success or authentication failure.

On the basis of the authentication result of at least any one of the UGV 1 and the article Co, at least the opening/closing control of the carry-in port IN1 from which the article Co is carried in at the delivery destination is performed by the opening/closing control device 2. Herein, the opening/closing control of the carry-in port IN1 means driving of an opening/closing door provided on the carry-in port IN1 (the same applies to a case of the carry-in port IN2). When the carry-in port IN1 is opened by opening driving of the opening/closing door, the UGV 1 may carry the article Co in from the carry-in port IN1 through a carry-out port provided thereon. Incidentally, the carry-out port of the UGV 1 is opened when the carry-in port IN1 is opened. The recipient may receive the article Co carried in from the carry-in port IN1 from the inside of the delivery destination. In contrast, when the carry-in port IN1 is closed (in other words, blocked) by closing driving of the opening/closing door, the opening/closing door is locked, and it becomes impossible to carry the article Co in from the carry-in port IN1.

Moreover, there is a case where the carry-in ports IN1 and IN2 are provided depending on the delivery destination. In this case, the authenticating process of authenticating the UGV 1 is performed as a first step (first stage), and on the basis of the authentication result, the article Co is carried in from the carry-in port IN1 opened by the opening/closing control described above. Then, the authenticating process of authenticating the article Co carried in from the carry-in port IN1 is performed as a second step (first stage), and on the basis of the authentication result, the opening/closing control of the carry-in port IN2 from which the article Co is further carried in is performed by the opening/closing control device 2. When the carry-in port IN2 is opened by the opening driving of the opening/closing door, the UGV 1 may carry the article Co in from the carry-in port IN2. Such two-step authentication may further improve security when the article Co is carried in from the carry-in port IN2 through the carry-in port IN1. As described above, in a case where the carry-in ports IN1 and IN2 are provided, the recipient may receive the article Co from the inside of the delivery destination only when the article Co is carried in from the carry-in port IN2.

Herein, the delivery destination means the building or the room (also called as a section) in the building. Types of the buildings include housing (for example, independent housing and collective housing), an office, an accommodation facility (for example, a hotel), a shop and the like. In a case where the building is the independent housing, the building is also referred to as a home. In contrast, in a case where the building is the collective housing (for example, a condominium or an apartment), each room in the building is also referred to as a home. Also, in a case where the building is the accommodation facility, each room in the building is also referred to as a guest room. The carry-in port IN1 is an opening provided at a boundary between the outside and the inside of the building, or at a boundary between the outside and the inside of the room in the building that enables access from the outside to the inside. The boundary is, for example, a door (for example, a gate door and an entrance door) of an entrance (for example, a gate or an entrance hall) of the building or the room, or a wall in the vicinity of the entrance. The inside of the building or the room means a space where a person related to the building or the room (for example, a resident, an employee, and a guest) may enter and the entered person may receive the article Co (for example, a living space, a work space, and an accommodation space).

In a case where the carry-in port IN2 is not provided, in a state in which the carry-in port IN1 is opened, the carry-in port IN1 is the opening through which a person other than the person related to the building or the room also may access from the outside to the inside of the building or the room. In contrast, in a case where the carry-in port IN2 is provided, unless the carry-in ports IN1 and IN2 are simultaneously opened, it is not possible to access from the outside to the inside of the building or the room. However, in this case, in a state in which the carry-in ports IN1 and IN2 are simultaneously opened, the carry-in ports IN1 and IN2 are the openings through which the person other than the person related to the building or the room also may access from the outside to the inside of the building or the room. It is not preferable from a viewpoint of security that the person other than the person related to the building or the room may access from the outside to the inside of the building or the room in this manner; also, it is not preferable from the viewpoint of security that not only a person but also a suspicious UGV and the like may access from the outside to the inside of the building or the room. When this embodiment is applied in such a situation, a remarkable effect may be obtained from the viewpoint of security.

Figure 3:
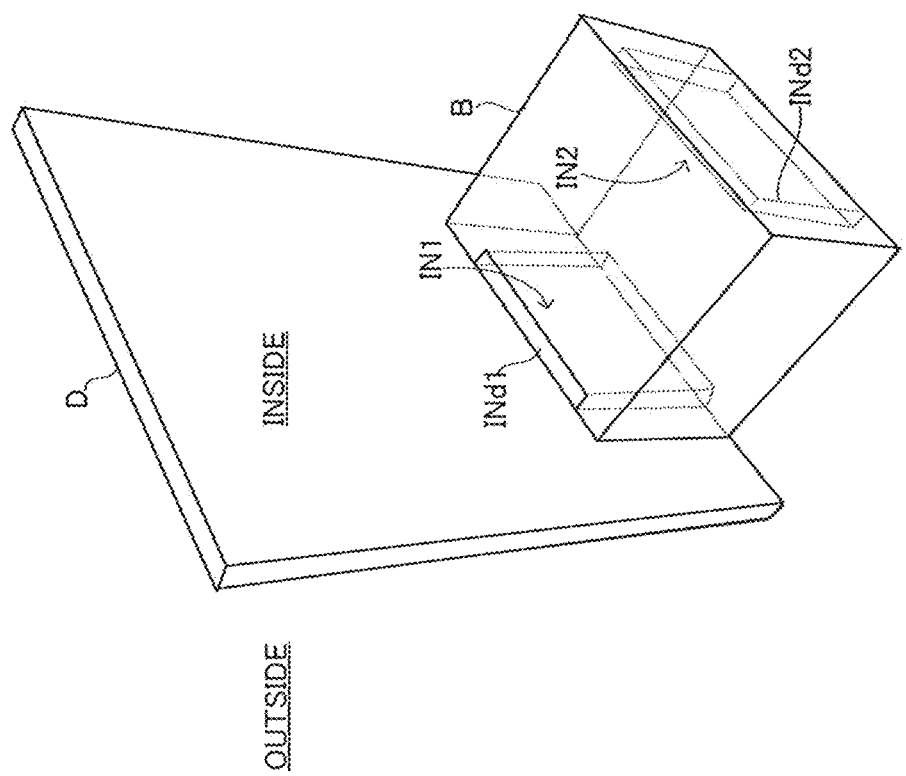
FIG. 3 is an overhead view of an entrance of a room in a building from an inside of the room.

FIG. 2 is a view illustrating an example of an installation position of the carry-in port IN1. In the example in FIG. 2, the carry-in port IN1 is provided on a lower portion 101 of an entrance door D or on a wall 102 in the vicinity of the entrance (for example, near a position on a shoe storage box placed inside the room). In contrast, although an installation position of the carry-in port IN2 is not illustrated in FIG. 2, this is provided further inside the above-described boundary. FIG. 3 is an overhead view of the entrance of the room in the building from the inside of the room (however, the wall being the boundary between the outside and the inside of the room is not illustrated). In the example in FIG. 3, an inner box B that forms a closed space and includes the carry-in port IN2 is provided inside an opening/closing door INd1 of the carry-in port IN1 provided on the lower portion of the entrance door D. That is, an inlet of the inner box B serves as the carry-in port IN1 and an outlet of the inner box B serves as the carry-in port IN2. The article Co carried in from the carry-in port IN1 when the carry-in port IN1 is opened (in other words, when the opening/closing door INd1 is opened) passes through the closed space of the inner box B, and further carried in from the carry-in port IN2 when the carry-in port IN2 is opened (in other words, when the opening/closing door INd2 is opened).

Figure 4:
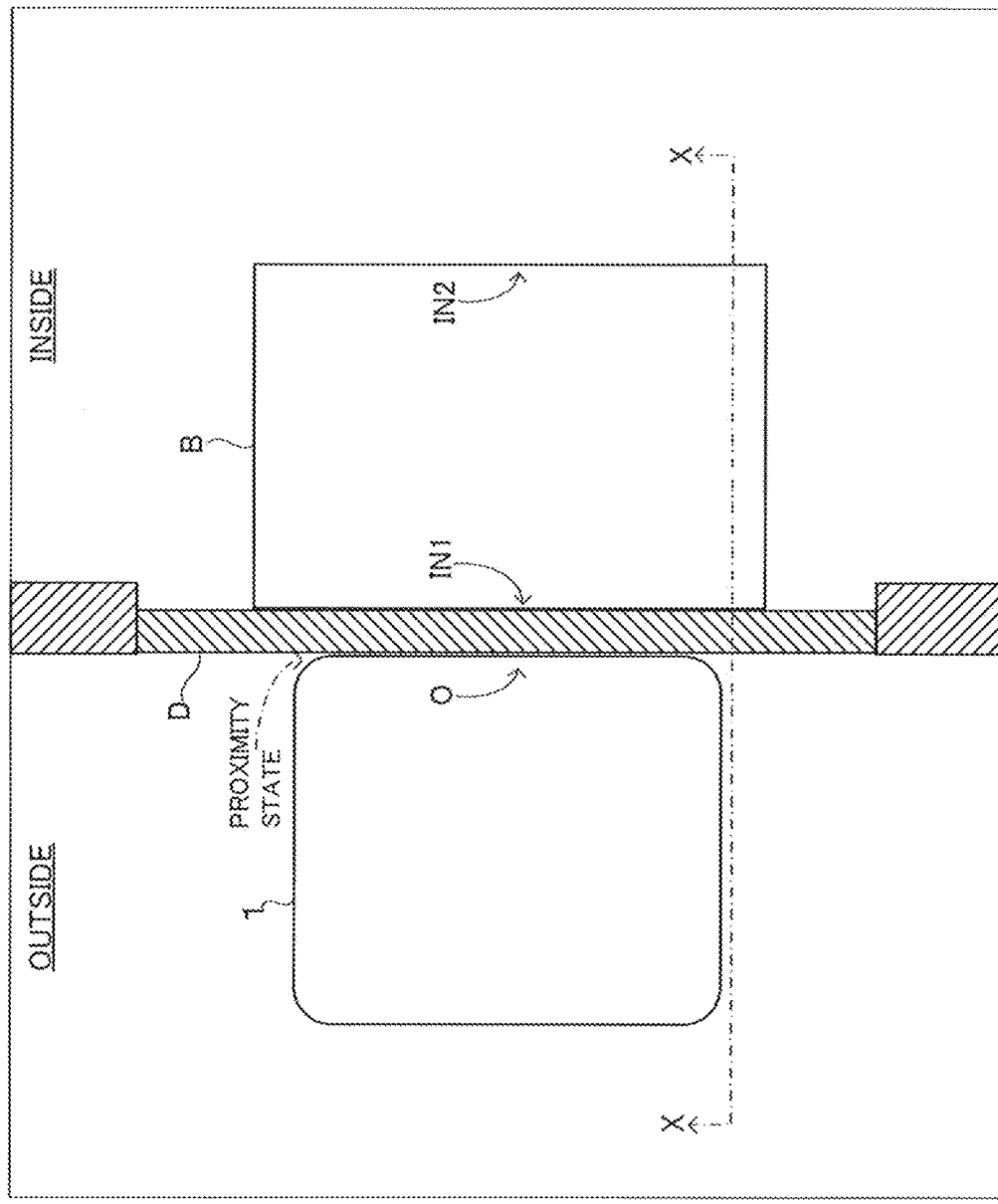
FIG. 4 is a view of an entrance of a room in a building as seen from directly above.
Figure 5:
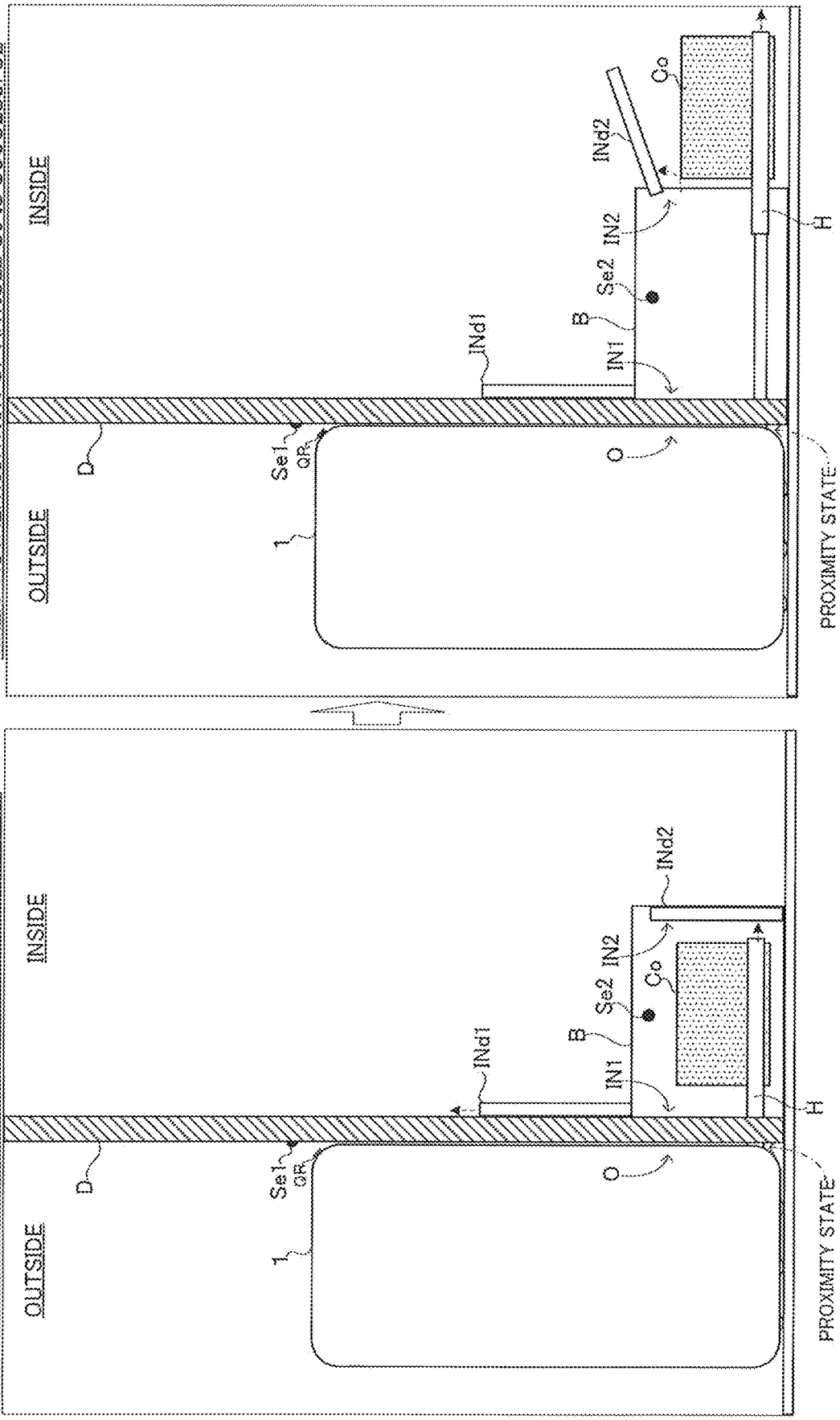
FIG. 5 is a view illustrating states when an article Co is carried out from a carry-out port O and carried in from a carry-in ports IN1 and IN2.

FIG. 4 is a view of the entrance of the room in the building as seen from directly above (however, a ceiling of the room is not illustrated). An example in FIG. 4 illustrates a state in which the UGV 1 and the carry-in port IN1 are close to each other (proximity state). At that time, a carry-out port O of the UGV 1 faces the carry-in port IN1, and the article Co loaded into the UGV 1 may be carried out from the carry-out port O and carried in from the carry-in port IN1. In such proximity state, the article Co is carried in after the authenticating process. FIGS. 5 and 6 are views illustrating states when the article Co is carried out from the carry-out port O and carried in from the carry-in ports IN1 and IN2. Incidentally, FIGS. 5 and 6 are cross-sectional views taken along line X-X in FIG. 4. FIG. 5 illustrates an example in which the inner box B of a size capable of accommodating an entire article Co is installed, and FIG. 6 illustrates an example in which the inner box B of a size that cannot accommodate the entire article Co is installed. As illustrated in FIGS. 5 and 6, a sensor Se1 for obtaining (that is, reading) the vehicle ID of the UGV 1 is provided on a surface of the door D (outside the room), and the sensor Se1 is electrically connected to the opening/closing control device 2. The sensor Se1 is a sensor device such as a camera and an RFID reader, for example. The vehicle ID of the UGV 1 may be added as a two-dimensional code (for example, a QR code) on the surface of the UGV 1, for example (for example, a sticker of a two-dimensional barcode may be adhered), or displayed as the two-dimensional code on a display panel provided on the surface of the UGV 1. For example, as illustrated in FIGS. 5 and 6, the two-dimensional code QR is added or displayed in a position detectable by the sensor Se1. As a result, the opening/closing control device 2 may obtain the vehicle ID of the UGV 1 through the sensor Se1. Incidentally, the vehicle ID of the UGV 1 may be stored in an RFID tag attached to the surface of the UGV 1 (for example, a passive RFID tag having a short communication distance of several tens of centimeters), for example. In this case, the opening/closing control device 2 obtains the vehicle ID of the UGV 1 from the RFID tag through the sensor Se1. Alternatively, the vehicle ID of the UGV 1 may be stored in a storage unit in the UGV 1. In this case, the opening/closing control device 2 obtains the vehicle ID of the UGV 1 by the short-range wireless communication with the UGV 1.

The authenticating process of authenticating the UGV 1 is performed using the vehicle ID obtained by the opening/closing control device 2 in this manner. In a case where the authentication result of the UGV 1 is authentication success (that is, in a case where the authentication of the UGV 1 is successful), a lock of the opening/closing door INd1 is released as illustrated on a left side in FIGS. 5 and 6 by the opening/closing control of the carry-in port IN1, and the article Co (that is, the article Co carried out from the carry-out port O of the UGV 1) is carried in from the carry-in port IN1 opened when the opening/closing door INd1 moves (for example, slides) vertically upward (in the drawing, an upward arrow direction). Incidentally, the UGV 1 performs carrying-out/carrying-in control of carrying the article Co out from the carry-out port O and carrying the same in from the carry-in port IN1. In the examples in FIGS. 5 and 6, the article Co is held by an article holder H provided on the UGV 1 (for example, the article Co is sandwiched from both sides), and in this state, the article holder H is extended from the carry-out port O of the UGV 1 in a direction toward the carry-in port IN1 (rightward arrow direction in the drawing), so that the article Co is carried in the inner box B from the carry-in port IN1. Incidentally, in the example in FIG. 5, when the entire article Co enters the inner box B, extension of the article holder H is stopped, but in the example in FIG. 6, when a part of the article Co enters the inner box B, the extension of the article holder H is stopped.

Moreover, as illustrated in FIGS. 5 and 6, in the inner box B, a sensor Se2 for obtaining the article ID of the article Co (this may also be the order ID; the same applies hereinafter) is provided, and the sensor Se2 is connected to the opening/closing control device 2 by wire or wirelessly. That is, the sensor Se2 is provided between the carry-in ports IN1 and IN2. The sensor Se2 is, for example, a sensor device such as a camera. The article ID of the article Co is added to a surface of the article (a position detectable by the sensor Se2) as a two-dimensional code, for example. As a result, the opening/closing control device 2 may obtain the article ID through the sensor Se2. By providing the sensor Se2 between the carry-in ports IN1 and IN2 in this manner, unless (the entire or a part of the) article Co is carried in from the carry-in port IN1, the article ID of the article Co cannot be obtained and the authenticating process of authenticating the article Co cannot be executed. That is, the process of authenticating the article Co may be performed only in a case where the article Co is carried in from the carry-in port IN1 on the basis of the authentication result (authentication success) of the UGV 1. Therefore, the security when the article Co is carried in from the carry-in port IN2 through the carry-in port IN1 by the UGV 1 may be further improved. Incidentally, the article ID of the article Co may be stored in the RFID tag attached to the surface of the article Co, for example. In this case, the opening/closing control device 2 obtains the article ID of the article Co from the RFID tag through the sensor Se2. In this case, the sensor Se2 may be an RFID reader. Moreover, in this manner, the sensor Se2 may be a sensor corresponding to a medium in which the article ID is stored or recorded.

The authenticating process of authenticating the article Co is performed using the article ID obtained by the opening/closing control device 2 in this manner. In a case where the authentication result of the article Co is authentication success (that is, in a case where the authentication of the article Co is successful), a lock of the opening/closing door INd2 is released as illustrated on a right side in FIGS. 5 and 6 by the opening/closing control of the carry-in port IN2, and the article Co (that is, the article Co carried out from the carry-out port O and carried in from the carry-in port IN1) is carried in from the carry-in port IN2 opened when the opening/closing door INd2 moves (for example, rotates) in the extending direction of the article holder H (oblique upward arrow direction in the drawing). In the examples in FIGS. 5 and 6, the article holder H that holds the article Co further extends in the direction toward the carry-in port IN2 (rightward arrow direction in the drawing), so that the article Co is carried further in the room (inside of the room) from the carry-in port IN2. Then, as illustrated on the right side in FIGS. 5 and 6, when the carrying-in of the article Co from the carry-in port IN2 is completed, the extension of the article holder H is stopped, and the article Co is separated from the article holder H to be placed on a floor in the room. Thereafter, the article holder H returns into the UGV 1 through the carry-out port O and the like, and the carry-in ports IN1 and IN2 are closed again to be locked. In contrast, in a case where the authentication result of the article Co is authentication failure (that is, in a case where the authentication of the article Co is failed), the article Co carried in from the carry-in port IN1 by the above-described carrying-in control is not carried in from the carry-in port IN2 but is returned (recovered) to the UGV 1 through carry-out port O and the like. According to this configuration, it is possible to prevent the recipient from unintentionally receiving an unrecognized article Co. Return control of returning the article Co carried in from the carry-in port IN1 is performed by, for example, the UGV 1. In this case, the article holder H returns to the UGV 1 without separating the held article Co.

Incidentally, in the examples in FIGS. 5 and 6, the examples are illustrated in which the carry-out port O of the UGV 1 is provided on a lower portion of the UGV 1 (a position facing the lower portion 101 of the door D illustrated in FIG. 2); however, the carry-out port O of the UGV 1 may be provided on an upper portion (for example, a position facing the wall 102 in the vicinity of the entrance illustrated in FIG. 2) or the central portion of the UGV 1. Moreover, in the examples in FIGS. 5 and 6, the examples are illustrated in which the UGV 1 carries the article Co in while holding the same by the article holder H; however, it is also possible to configure such that the article Co is carried in by another carrying-in mechanism. For example, it is possible that the UGV 1 is provided with an article placing table, and the UGV 1 is configured to move the article placing table on which the article Co is placed in the direction toward the carry-in port IN1 through the carry-out port O (move as is the case with the article holder H) to carry the article Co in. In this case, an opening/closing port for allowing the article Co to drop may be provided on an article contact surface on the article placing table. Alternatively, it is also possible to configure such that a member inserted into the room (in this example, into the inner box B) as the article holder H and the article placing table is not provided, the UGV 1 is provided with a mechanism of pushing out the article Co from the carry-out port C in the direction toward the carry-in port IN1, and the article Co is simply pushed out by the pushing-put mechanism to be carried in from the carry-in port IN1. Moreover, in the examples in FIGS. 5 and 6, the examples are illustrated in which the carry-in port IN2 is opened in the state in which the carry-in port IN1 opened, but it is also possible to configure such that, after the article Co is carried in from the carry-in port IN1, the carry-in port IN2 may be opened only in a case where the carry-in port IN1 is closed. In this case, by providing the returning mechanism for returning the article Co in the inner box B, the return control of returning the article Co carried in from the carry-in port IN1 may be performed by the opening/closing control device 2.

[1-1. Configuration and Functional Outline of UGV 1]

Figure 7:
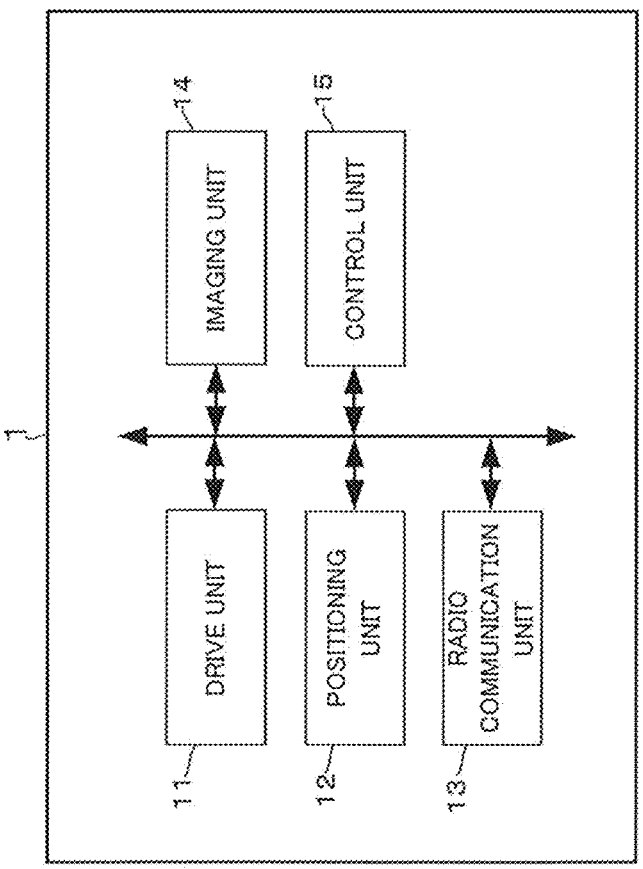
FIG. 7 is a view illustrating a schematic configuration example of an UGV 1.

Next, a configuration and a functional outline of the UGV 1 are described with reference to FIG. 7. FIG. 7 is a view illustrating a schematic configuration example of the UGV J. As illustrated in FIG. 7, the UGV 1 is provided with a drive unit 11, a positioning unit 12, a radio communication unit 13, an imaging unit 14, a control unit 15 and the like. Incidentally, although not illustrated, the UGV 1 is provided with a wheel, an article carrying-out/carrying-in mechanism, a battery that supplies electric power to each unit of the UGV 1 and the like. A plurality of articles may be loaded into the UGV 1. The article carrying-out/carrying-in mechanism is formed of, for example, the carry-out port O, the article holder H, a motor and the like. The UGV 1 also stores the vehicle ID of the UGV 1. Moreover, the display panel. that displays the two-dimensional code and the like may be provided on an upper portion of a front surface of the UGV 1, for example. Further, the UGV 1 may be provided with an internal sensor for obtaining the article ID from the loaded article Co.

The drive unit 11 is provided with a motor, a rotating shaft and the like. The drive unit 11 rotates a plurality of wheels by the motor, the rotating shaft and the like driven according to a control signal output from the control unit 15. Incidentally, the drive unit 11 may also be provided with an engine driven by fuel together with or in place of the motor. The positioning unit 12 is provided with a radio wave receiver and the like. The positioning unit 12 receives a radio wave transmitted from a satellite of a GNSS (Global Navigation Satellite System) by the radio wave receiver, and detects a current position (latitude and longitude) of the UGV 1 on the basis of the radio wave, for example. Incidentally, the current position of the UGV 3 may be corrected on the basis of an image captured by the imaging unit 14. Current position information indicating the current position detected by the positioning unit 12 is output to the control unit 15. The radio communication unit 13 controls communication performed via the communication network NW and the short-range wireless communication performed with the opening/closing control device 2. The imaging unit 14 is provided with a camera and the like. The camera is used for movement control of the UGV 1. The imaging unit 14 continuously images a real space within a range that falls within an angle of view of the camera. Image information captured by the imaging unit 14 is output to the control unit 15.

The control unit 15 is provided with a central processing unit (CPU) as a processor, a read only memory (ROM), a random access memory (RAM) and the like, and executes various types of control according to a control program stored in the ROM (or a non-volatile memory). Specifically, the control unit 15 serves as a movement control unit, and performs the movement control of moving the UGV 1 to the delivery destination of the article Co. In this movement control, the position information obtained from the positioning unit 12, the image information obtained from the imaging unit 14, and the delivery destination information are used to control a rotational speed of the wheels, and control the position and a traveling direction of the UGV 1. By this configuration, the UGV 1 can autonomously move to the delivery destination. Herein, the delivery destination information is obtained from the delivery management server 4. The delivery destination information includes a delivery destination ID for identifying the delivery destination, location information of the delivery destination and the like. The delivery destination ID may also be a door ID for identifying the door D of the delivery destination. The location information of the delivery destination may also be position information (latitude and longitude) of the delivery destination. Moreover, the delivery destination information may also include a delivery route from a delivery source (departure point) to the delivery destination (destination) of the UGV 1. The delivery route may be determined by the control unit 15, or may be determined by the operation management server 3. Moreover, the delivery destination information may also include a name, a telephone number, and an e-mail address of the recipient of the article Co.

Then, the control unit 15 performs the movement control such that the UGV 1 that arrives at the delivery destination comes closer to the carry-in port IN1, and the carry-out port O of the UGV 1 faces the carry-in port IN1. For example, the control unit 15 specifies a three-dimensional position of the carry-in port IN1 (for example, a position (x,y,z) with the center of the carry-out port O of the UGV 1 as an origin) on the basis of the image information obtained from the imaging unit 14, for example. Then, the control unit 15 adjusts the position of the UGV 1 such that the specified carry-in port IN1 faces the carry-out port O and a distance between the carry-in port IN1 and the carry-out port O falls within a predetermined range. Herein, the predetermined range is a range for securing a state in which the UGV 1 is close to the carry-in port IN1, and may be set to a range in which they are brought into close contact with each other with a gap as little as possible (for example, 0 mm or larger and 100 mm or smaller). Incidentally, the control unit 15 may display the two-dimensional code including the vehicle ID of the UGV 1 on the display panel of the UGV 1 when the UGV 1 comes closer to the carry-in port IN1. Moreover, the control unit 15 may also display a two-dimensional code including the vehicle ID of the UGV 1 and a one-time password generated on the basis of a current time on the display panel of the UGV 1 when the UGV 1 comes closer to the carry-in port IN1.

Moreover, the control unit 15 serves as a carrying-in control unit and performs the carrying-out/carrying-in control of carrying the article Co loaded into the UGV 1 out from the carry-out port O and carrying the same in from the carry-in port IN1. For example, in response to an opening notice of the carry-in port IN1 from the opening/closing control device 2, the control unit 15 opens the carry-out port O that is closed during the movement of the UGV 1 and extends the article holder H that holds the article Co from the carry-out port O in the direction toward the carry-in port IN1 to carry the article Co in from the carry-in port IN1. Then, when the control unit 15 determines that the entire or a part of the article Co enters the inner box B, this stops extending the article holder H. Further, in response to an opening notice of the carry-in port IN2 from the opening/closing control device 2, for example, the control unit 15 carries the article Co in from the carry-in port IN2 by further extending the article holder H that holds the article Co in the direction toward the carry-in port IN2. Then, when determining that the carrying-in of the article Co from the carry-in port IN2 is completed, the control unit 15 stops extending the article holder H, and separates the article Co from the article holder H. With this configuration, the article Co is placed on the floor in the room.

Incidentally, the control unit 15 may serve as a return control unit and perform the return control of returning the article Co carried in from the carry-in port IN1. In this case, the control unit 15 recovers the article Co into the UGV 1 by contracting the article holder H that holds the article Co in response to an authentication failure notice of the article Co from the opening/closing control device 2, for example.

[1-2. Configuration and Functional Outline of Opening/Closing Control Device 2]

Figure 8:
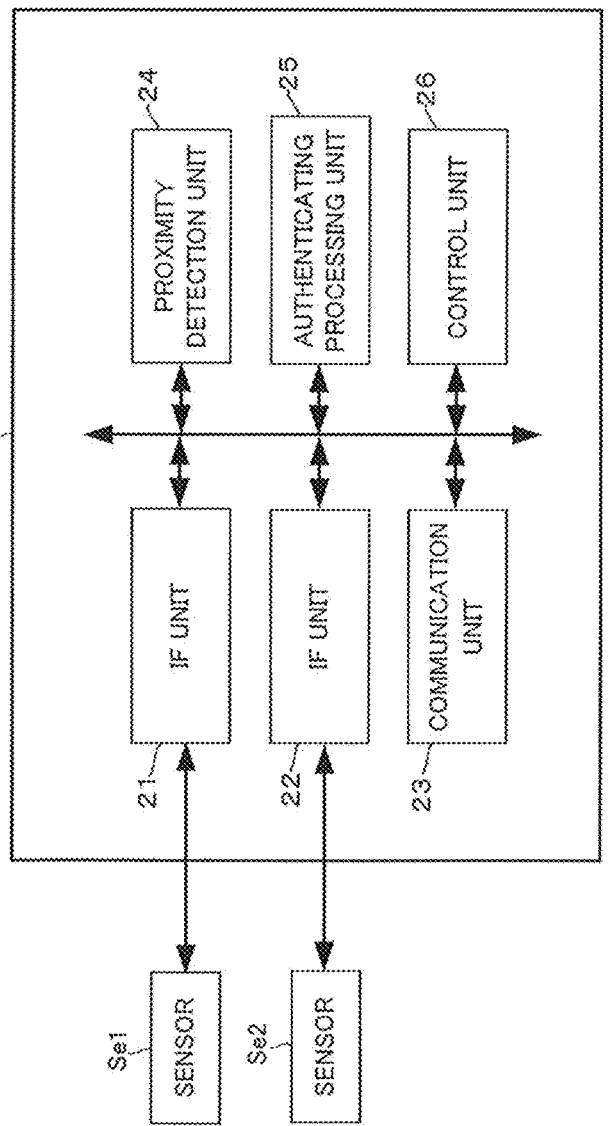
FIG. 8 is a diagram illustrating a schematic configuration example of an opening/closing control device 2.

Next, a configuration and a functional outline of the opening/closing control device 2 is described with reference to FIG. 8. FIG. 8 is a view illustrating a schematic configuration example of the opening/closing control device 2. As illustrated in FIG. 8, the opening/closing control device 2 is provided with IF units 21 and 22, a communication unit 23, a proximity detection unit 24, an authenticating processing unit 25, a control unit 26 and the like. Incidentally, although not illustrated, the opening/closing control device 2 is provided with an opening/closing mechanism and the like. The opening/closing mechanism is formed of, for example, the carry-in port IN1 (including the opening/closing door INd1), the carry-in port IN2 (opening/closing door INd2), a motor and the like. Moreover, the opening/closing control device 2 stores the delivery destination ID of the delivery destination in which the opening/closing control device 2 is installed. The IF unit 21 serves as an interface with the sensor Se1. The IF unit 22 serves as an interface with the sensor Se2. The communication unit 23 controls the communication performed via the communication network NW and controls the short-range wireless communication performed with the UGV 1.

The proximity detection unit 24 is provided with a CPU, a ROM, a RAM and the like, and performs a detecting process of detecting the state in which the UGV 1 and the carry-in port IN1 are close to each other (that is, the proximity state between the UGV 3 and the carry-in port IN1) on the basis of the information obtained by the sensor Se1. For example, in a case where the sensor Se1 is the camera, the proximity detection unit 24 detects the proximity state between the UGV 1 and the carry-in port IN1 in a case where this may recognize the two-dimensional code including the vehicle ID of the UGV 1 (or the above-described one-time password) of a predetermined size or larger during a predetermined time (for example, several seconds) or longer on the basis of the image information obtained by the sensor Se1. Herein, the predetermined size is a size according to the proximity state between the UGV 1 and the carry-in port IN1. When the UGV 1 and the carry-in port IN1 are not in the proximity state, the size of the recognized two-dimensional code is smaller than the predetermined size, so that the proximity state between the UGV 1 and the carry-in port IN1 is not detected.

Alternatively, in a case where the sensor Se1 is the RFID reader, the proximity detection unit 24 detects the proximity state between the UGV 1 and the carry-in port IN1 in a case where this may extract the vehicle ID of the UGV 1 from the information obtained by the sensor Se1 (that is, obtained from the passive RFID tag). When the UGV 1 and the carry-in port IN1 are not in the proximity state, the sensor Se1 cannot obtain the information including the vehicle ID from the passive RFID tag, so that the proximity state between the UGV 1 and the carry-in port IN1 is not detected. Incidentally, the sensor Se1 itself may have a detecting function of detecting the proximity state between the UGV 1 and the carry-in port IN1, and in this case, the proximity detection unit 24 obtains the information indicating that the UGV 1 and the carry-in port IN1 are in the proximity state from the sensor Se1. Alternatively, the control unit 15 of the UGV 1 may have the detecting function of detecting the proximity state between the UGV 1 and the carry-in port IN1 (for example, detecting in the above-described position adjustment during the movement control), and in this case, the proximity detection unit 24 obtains the information indicating that the UGV 1 and the carry-in port IN1 are in the proximity state from the UGV 1 via the communication unit 23.

The authenticating processing unit 25 is provided with a CPU, a ROM, a RAM and the like and performs the authenticating process of authenticating at least any one of the UGV 1 and the article Co in a case where the UGV 1 arrives at the delivery destination. Herein, the arrival of the UGV 1 at the delivery destination is determined, for example, by reception of the information obtained by the sensor Se1 from the UGV 1 (for example, the vehicle ID) via the IF unit 21. Alternatively, the arrival of the UGV 1 at the delivery destination is determined by the reception of the information (for example, the vehicle ID or a shared key generated by pairing) via the communication unit 23 by the short-range wireless communication with the UGV 1. The authenticating processing unit 25 may perform the authenticating process of authenticating the UGV 1 only in a case where the proximity detection unit 24 and the like detects the state in which the UGV 1 is close to the carry-in port IN1 (that is, the UGV 1 and the carry-in port IN1 are in the proximity state). As a result, the UGV 1 is authenticated and the lock of the opening/closing door INd1 is released only in a state in which the UGV 1 is close to (for example, attached firmly to) the carry-in port IN1, so that unexpected carrying-in of the article from other than the UGV 1 (for example, unintended reception into the room) may be prevented, and the security when the article Co is carried in from the carry-in port IN1 may be further improved. Similarly, the authenticating processing unit 25 may perform the authenticating process of authenticating the article Co only in a case where the proximity detection unit 24 and the like detects the state in which the UGV 1 and the carry-in port IN1 are close to each other. According to this configuration, even after the carry-in port IN1 is opened and the article Co is carried in from the carry-in port IN1, in a case where the UGV 1 is separated from the carry-in port IN1 before the carry-in port IN2 is opened, the carry-in port IN2 is not opened, so that the security may be further improved.

In the authenticating process of authenticating the UGV 1, the authenticating processing unit 25 transmits an authentication request including the vehicle ID obtained from the UGV 1 through the sensor Se1 and the like to the operation management server 3 and obtains the authentication result of the UGV 1 from the operation management server 3. Alternatively, the authenticating processing unit 25 may obtain in advance the vehicle ID of the UGV 1 scheduled to arrive at the delivery destination from the operation management server 3 and obtain the authentication result by determining whether or not the vehicle ID obtained from the operation management server 3 coincides with the vehicle ID obtained from the UGV 1 (authentication is successful when the vehicle IDs coincide with each other). Incidentally, the authenticating processing unit 25 may perform the authenticating process of authenticating the UGV 1 even when the proximity detection unit 24 and the like does not detect the state in which the UGV 1 and the carry-in port IN1 are close to each other. In this case, the authenticating processing unit 25 may obtain the authentication result by determining that the authentication is failed without transmitting the authentication request to the operation management server 3. This may also prevent the unexpected carrying-in of the article from other than the UGV 1, and may further improve the security when the article Co is carried in from the carry-in port IN1.

In contrast, in the authenticating process of authenticating the article Co, the authenticating processing unit 25 transmits an authentication request including the article ID obtained from the article Co through the sensor Se2 to the delivery management server 4 and obtains the authentication result of the article Co from the delivery management server 4. Alternatively, the authenticating processing unit 25 may obtain in advance the article ID of the delivered article Co from the delivery management server 4 and obtain the authentication result by determining whether or not the article ID obtained from the delivery management server 4 coincides with the article ID obtained from the article Co (authentication is successful when the article IDs coincide with each other). Incidentally, the authenticating processing unit 25 may perform the authenticating process of authenticating the article Co even when the proximity detection unit 24 and the like does not detect the state in which the UGV 1 and the carry-in port IN1 are close to each other. In this case, the authenticating processing unit 25 may obtain the authentication result by determining that the authentication is failed without transmitting the authentication request to the operation management server 3. By this also, in a case where the UGV 1 is separated from the carry-in port IN1 before the carry-in port IN2 is opened after the article Co is carried in from the carry-in port IN1, the carry-in port IN2 is not opened, so that the security may be further improved.

The control unit 26 is provided with a CPU, a ROM, a RAM and the like, and executes various controls according to a control program stored in the ROM (or a non-volatile memory). Specifically, the control unit 26 serves as the opening/closing control unit and performs the opening/closing control of the carry-in port IN1 on the basis of the authentication result of the UGV 1 obtained by the authenticating processing unit 25. For example, in a case where the authentication result of the UGV 1 is the authentication success, the control unit 26 releases the lock of (that is, unlocks) the opening/closing door INd1, and drives the opening/closing door INd1 in a predetermined direction (for example, vertically upward as illustrated in FIGS. 5 and 6) to open the carry-in port IN1. In contrast, in a case where the authentication result of the UGV 1 is the authentication failure, the control unit 26 maintains the lock of the opening/closing door INd1. With this configuration, the carry-in port IN1 is not opened even manually.

Moreover, the control unit 26 performs the opening/closing control of the carry-in port IN2 on the basis of the authentication result of the article Co obtained by the authenticating processing unit 25. For example, in a case where the authentication result of the article Co is the authentication success, the control unit 26 releases the lock of the opening/closing door INd2, and drives the opening/closing door INd2 in a predetermined direction (for example, an extending direction of the article holder H as illustrated in FIGS. 5 and 6) to open the carry-in port IN2. In contrast, in a case where the authentication result of the article Co is the authentication failure, the control unit 26 maintains the lock of the opening/closing door INd2. With this configuration, the carry-in port IN2 is not opened even manually. Incidentally, in a case where the authentication result of the article Co is the authentication failure, the control unit 26 may serve as a notice processing unit and issue an inquiry notice of receivability of the article Co to the recipient of the article Co. This inquiry notice may be issued, for example, by sending an inquiry mail to the e-mail address of the recipient of the article Co. In this case, the control unit 26 serves as a receivability information reception unit, and receives receivability information indicating receivability selected by the recipient in response to the above-described inquiry notice from a terminal of the recipient (for example, a smartphone). Then, the control unit 26 performs the opening/closing control of the carry-in port IN2 on the basis of the received receivability information. For example, in a case where the received receivability information indicates that the reception is possible, the control unit 26 releases the lock of the opening/closing door INd2 and drives the opening/closing door INd2 in a predetermined direction to open the carry-in port IN2. In contrast, in a case where the received receivability information indicates that the reception is not possible, the control unit 26 maintains the lock of the opening/closing door INd2.

Incidentally, in a case where the returning mechanism for returning the article Co is provided in the inner box B in the building, the control unit 26 may serve as a return control unit and perform return control of returning the article Co carried in from the carry-in port IN1 to the UGV 1.

[1-3. Configuration and Functional Outline of Operation Management Server 3]

Figure 9:
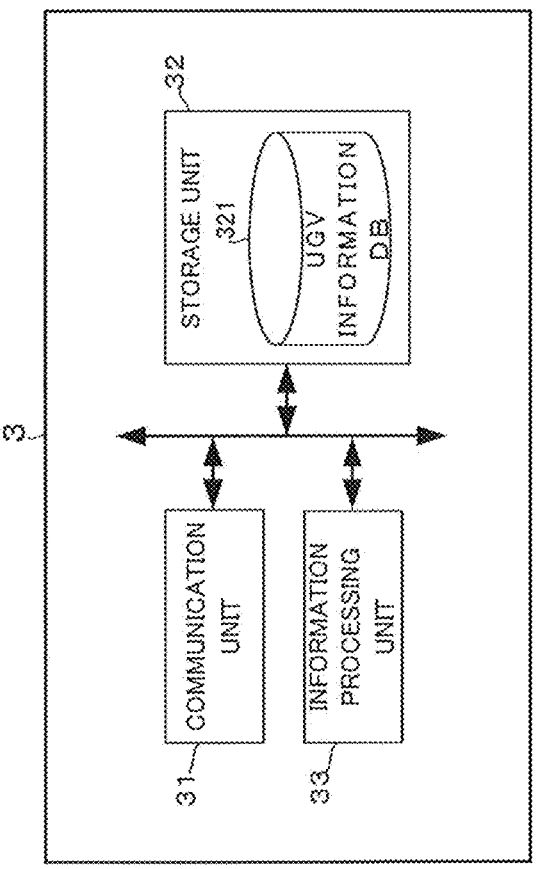
FIG. 9 is a diagram illustrating a schematic configuration example of an operation management server 3.

Next, a configuration and a functional outline of the operation management server 3 are described with reference to FIG. 9. FIG. 9 is a view illustrating a schematic configuration example of the operation management server 3. As illustrated in FIG. 9, the operation management server 3 is provided with a communication unit 31, a storage unit 32, an information processing unit 33 and the like. Incidentally, the operation management server 3 may be formed of a plurality of servers. The communication unit 31 controls the communication performed via the communication network NW. The storage unit 32 is provided with, for example, a hard disk drive and the like. In the storage unit 32, a UGV information database (DB) 321 and the like is constructed.

In the UGV information database 321, the vehicle ID of the UGV 1 of which operation is to be managed, the article ID of the article Co to be delivered, the delivery destination information (including the delivery destination ID and the location information) and the like are associated with one another for each UGV 1 to be registered. In a case where the article Co is the product ordered for purchase by the recipient, the order ID for identifying the order is registered in association with the article ID.

The information processing unit 33 is provided with a CPU, a ROM, a RAM and the like, and serves as an authenticating processing unit in response to the authentication request from the opening/closing control device 2 to perform the authenticating process of authenticating the UGV 1. For example, the information processing unit 33 determines whether or not the vehicle ID included in the authentication request from the opening/closing control device 2 is registered in the UGV information database 321, thereby obtaining an authentication result (if the vehicle ID is registered, the authentication is successful), and transmits the authentication result to the opening/closing control device 2. Alternatively, in a case where there is a UGV information request including the delivery destination ID from the opening/closing control device 2, the information processing unit 33 may obtain the vehicle ID associated with the delivery destination ID from the UGV information database 321 and transmit the obtained vehicle ID to the opening/closing control device 2 for authenticating the UGV 1. Moreover, in a case where there is a delivery route request including the delivery destination information and the current position information of the UGV 1 from the UGV 1, the information processing unit 33 may determine the delivery route from the delivery source to the delivery destination of the UGV 1 on the basis of the delivery destination information and the current position information of the UGV 1 and transmit information indicating the determined delivery route to the UGV 1.

[1-4. Configuration and Functional Outline of Delivery Management Server 4]

Figure 10:
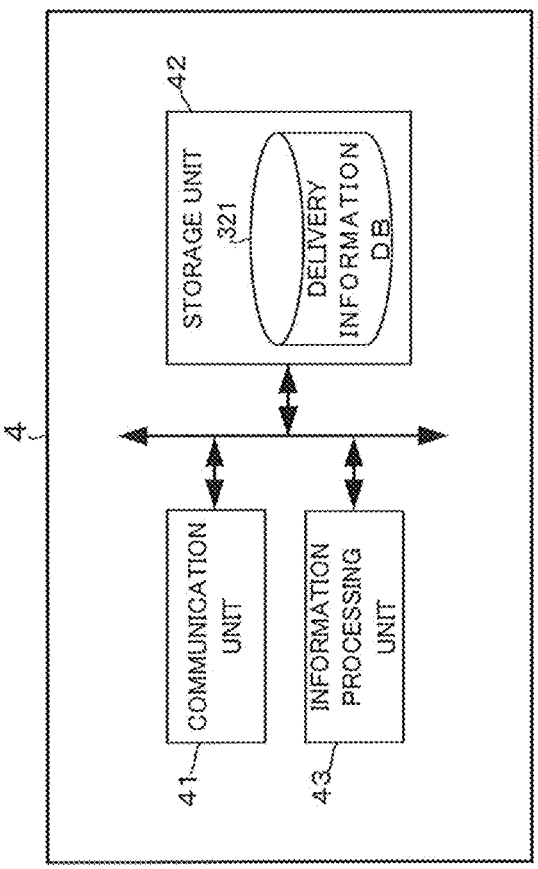
FIG. 10 is a diagram illustrating a schematic configuration example of a delivery management server 4.

Next, a configuration and a functional outline of the delivery management server 4 are described with reference to FIG. 10. FIG. 10 is a view illustrating a schematic configuration example of the delivery management server 4. Incidentally, the delivery management server 4 may be formed of a plurality of servers. Moreover, the delivery management server 4 serves as an order management server that performs product order management. As illustrated in FIG. 10, the delivery management server 4 is provided with a communication unit 41, a storage unit 42, an information processing unit 43 and the like. The communication unit 41 controls the communication performed via the communication network NW. The storage unit 42 is provided with, for example, a hard disk drive and the like. In the storage unit 42, a delivery information database (DB) 421 and the like is constructed.

In the delivery information database 421, the article ID of the article Co to be delivered, the delivery destination information (including the delivery destination ID and the location information), a delivery status and the like are associated with one another for each article to be registered. In a case where the article Co is the product ordered for purchase by the recipient (that is, a paid product), the order information of the product is registered in association with the article ID. The order information includes the order ID, a product name, an orderer's (recipient's) name, an orderer's address, an orderer's phone number, an orderer's e-mail address, ordered date and time, date and time of payment, a payment method, a paid price and the like.

The information processing unit 43 is provided with a CPU, a ROM, a RAM and the like and serves as an authenticating processing unit in response to the authentication request from the opening/closing control device 2 to perform the authenticating process of authenticating the article Co. For example, the information processing unit 43 determines whether or not the article ID included in the authentication request from the opening/closing control device 2 is registered in the delivery information database 421, thereby obtaining an authentication result (if the article ID is registered, the authentication is successful) and transmits the authentication result to the opening/closing control device 2. Alternatively, in a case where there is an article information request including the delivery destination ID from the opening/closing control device 2, the information processing unit 33 may obtain the article ID associated with the delivery destination ID from the delivery information database 421 and transmit the obtained article ID to the opening/closing control device 2 for authenticating the article Co. Herein, the article information request may include the vehicle ID of the UGV 1 authenticated at the first step in place of the delivery destination ID. Incidentally, the information processing unit 43 also serves as an order information management unit that manages the order information of the product ordered for purchase.

[2. Operation of Delivery System S]

Figure 11:
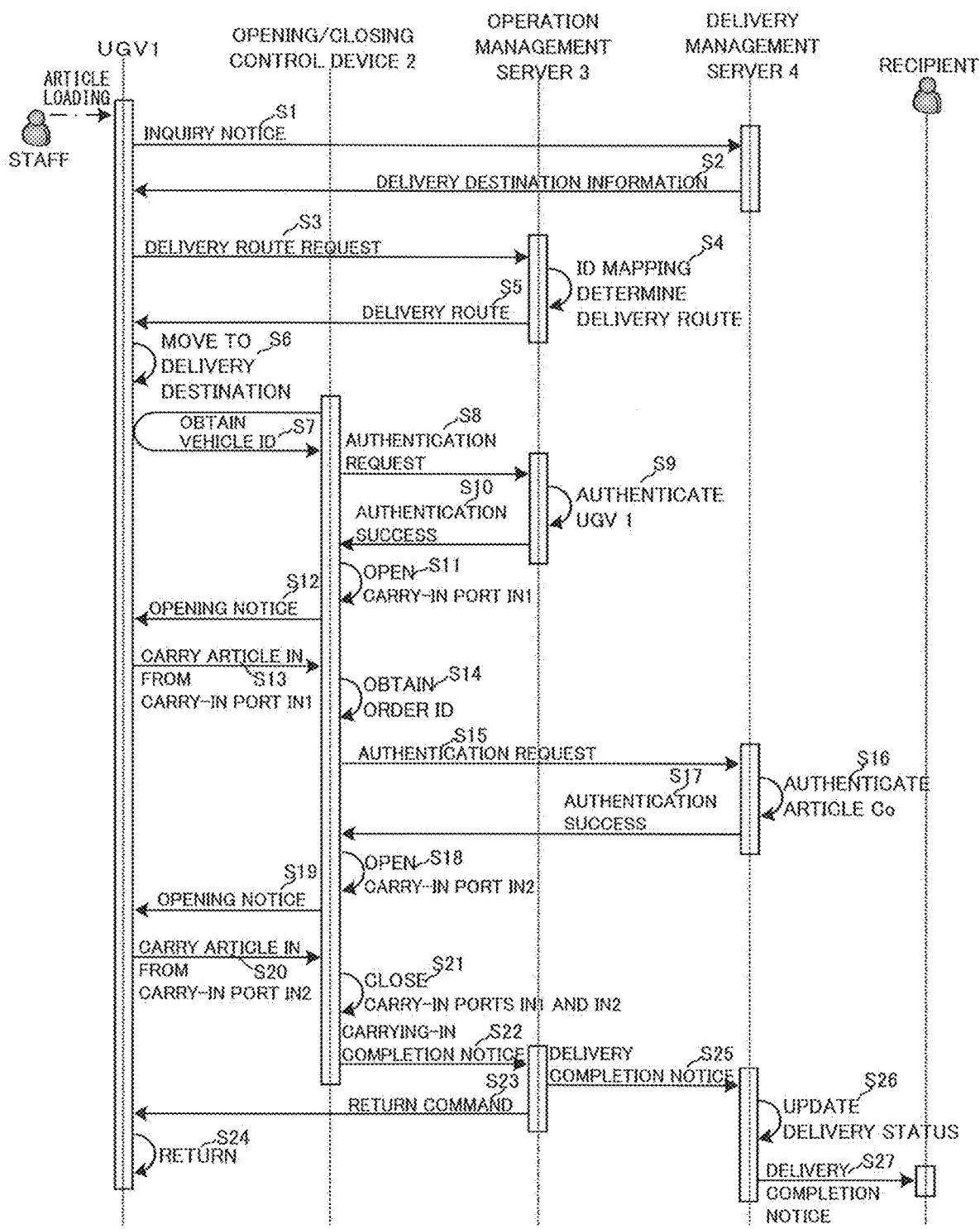
FIG. 11 is a sequence diagram illustrating an example of an operation of a delivery system S when an UGV 1 delivers an article Co unmanned.

Next, an example of operation of the delivery system S according to this embodiment is described with reference to FIG. 11. FIG. 11 is a sequence diagram illustrating the example of the operation of the delivery system S when the UGV 1 delivers the article Co unmanned. Incidentally, in the operation example described below, it is assumed that the article Co to be delivered is a product ordered by the recipient on an EC (Electronic Commerce) site, and the delivery destination information and the order information of the article Co are registered in the delivery information database 421.

At the delivery source of the ordered article Co, for example, when the article Co is loaded into the UGV 1 by a staff operating the UGV 1, the UGV 1 obtains the order ID from the loaded article Co (for example, obtains from the two-dimensional code attached to the surface of the article Co by the internal sensor of the UGV 1), and issues an inquiry notice of the delivery destination of the article Co to the delivery management server 4 (step S1). In this inquiry notice, a delivery destination inquiry message including the obtained order ID is transmitted from the UGV 1 to the delivery management server 4 via the communication network NW.

The delivery management server 4 obtains the delivery destination information associated with the order information including the received order ID from the delivery information database 421 in response to the inquiry notice from the UGV 1, and transmits the obtained delivery destination information to the UGV 1 via the communication network NW (step S2). Incidentally, when the delivery management server 4 transmits the delivery destination information, this registers delivery start as the delivery status associated with the order information including the above-described order ID in the delivery information database 421. When the UGV 1 receives the delivery destination information from the delivery management server 4, this issues a delivery route request to the operation management server 3 (step S3). In this delivery route request, a delivery route request message including the obtained order ID, the received delivery destination information, the vehicle ID of the UGV 1, and the current position information of the UGV 1 is transmitted from the UGV 1 to the operation management server 3 via the communication network NW. Herein, the current position information of the UGV 1 indicates the current position detected by the positioning unit 12 of the UGV 1.

The operation management server 3 performs ID mapping in response to the delivery route request from the UGV 1 and determines the delivery route on the basis of the received delivery destination information and the current position information of the UGV 1 (step S4). Herein, in the ID mapping, the delivery destination ID included in the received delivery destination information is associated with the received vehicle ID, and the delivery destination ID and the received order ID are associated with each other to be stored. Moreover, when determining the delivery route, for example, map data indicating a route on which it is possible to move inside and outside the building is used. The operation management server 3 determines the delivery route by searching the map data for a route from the position of the delivery destination specified by the delivery destination information to the position indicated by the current position information. Next, the operation management server 3 transmits the information indicating the determined delivery route to the UGV 1 via the communication network NW (step S5).

When the UGV 1 receives the information indicating the delivery route from the delivery management server 4, this moves to the delivery destination of the article Co according to the movement control by the control unit 15 (step S6). Then, the UGV 1 that arrives at the delivery destination comes closer to the carry-in port IN1 and adjusts the position such that the carry-out port O of the UGV 1 faces the carry-in port IN1 according to the movement control by the control unit 15. At that time, the opening/closing control device 2 obtains the vehicle ID from the UGV 1 that arrives at the delivery destination through the sensor Se1 (step S7). Next, in a case where the proximity state between the UGV 1 and the carry-in port IN1 is detected, the opening/closing control device 2 transmits the authentication request including the vehicle ID obtained at step S7 to the operation management server 3 via the communication network NW (step S8).

The operation management server 3 performs the authenticating process of authenticating the UGV 1 in response to the authentication request from the opening/closing control device 2 (step S9). For example, the operation management server 3 determines whether or not the vehicle ID that coincides with the vehicle ID included in the authentication request is registered in the UGV information database 321, and in a case where the vehicle ID is registered, this determines that the authentication of the UGV 1 is successful and transmits the authentication result indicating the authentication success to the opening/closing control device 2 via the communication network NW (step S10). Incidentally, in a case where the vehicle ID that coincides with the vehicle ID included in the authentication request is not registered in the UGV information database 321, the operation management server 3 determines that the authentication of the UGV 1 is failed, and transmits the authentication result indicating the authentication failure to the opening/closing control device 2.

When the opening/closing control device 2 receives the authentication result indicating the authentication success from the operation management server 3, this opens the carry-in port IN1 according to the opening/closing control by the control unit 26 (step S11). Next, when the opening of the carry-in port IN1 is completed, the opening/closing control device 2 issues the opening notice of the carry-in port IN1 to the UGV 1 (step S12). In this opening notice, an opening completion message of the carry-in port IN1 is transmitted from the opening/closing control device 2 to the UGV 1 via the short-range wireless communication.

The UGV 1 opens the carry-out port O in response to the opening notice of the carry-in port IN1 from the opening/closing control device 2 and extends the article holder H that holds the article Co in the direction toward the carry-in port IN1, thereby carrying the article Co in from the carry-in port IN1 (step S13). Next, the opening/closing control device 2 obtains the order ID from the article Co carried in from the carry-in port IN1 through the sensor Se2 (step S14). Next, the opening/closing control device 2 transmits an authentication request including the order ID obtained at step S14 to the delivery management server 4 via the communication network NW (step S15).

The delivery management server 4 performs the authenticating process of authenticating the article Co in response to the authentication request from the opening/closing control device 2 (step S16). For example, the delivery management server 4 determines whether or not the order ID that coincides with the order ID included in the authentication request is included in the order information to be registered in the delivery information database 421, and in a case where the order ID is included in the order information to be registered, this determines that the authentication of the article Co is successful and transmits the authentication result indicating the authentication success (authentication OK) to the opening/closing control device 2 via the communication network NW (step S17). Since the authenticating process of authenticating the article Co is performed using the order ID included in the authentication request and the order information managed by the delivery management server 4 in this manner, it is possible to prevent the recipient from unintentionally receiving the unrecognized article Co. Incidentally, the delivery management server 4 determines that the authentication of the article Co is failed in a case where the order ID that coincides with the order ID included in the authentication request is not included in the order information to be registered in the delivery information database 421, and transmits the authentication result indicating the authentication failure (authentication NG) to the opening/closing control device 2.

When the opening/closing control device 2 receives the authentication result indicating the authentication success from the delivery management server 4, this opens the carry-in port IN2 according to the opening/closing control by the control unit 26 (step S18). Next, when the opening of the carry-in port IN2 is completed, the opening/closing control device 2 issues the opening notice of the carry-in port IN2 to the UGV 1 (step S19). In this opening notice, an opening completion message of the carry-in port IN2 is transmitted from the opening/closing control device 2 to the UGV 1 via the short-range wireless communication.

The UGV 1 extends the article holder H that holds the article Co in the direction toward the carry-in port IN2 in response to the opening notice of the carry-in port IN2 from the opening/closing control device 2, thereby further carrying the article Co in from the carry-in port IN2 (step S20) to separate the article Co from the article holder H. When the carrying-in of the article Co is completed in this manner, the article holder H returns into the UGV 1 through the carry-out port O and the like. When the carrying-in of the article Co from the carry-in port IN2 is completed, the opening/closing control device 2 closes and locks the carry-in ports IN1 and IN2 (step S21). Next, the opening/closing control device 2 issues a carrying-in completion notice of the article Co to the operation management server 3 (step S22). In the carrying-in completion notice, a carrying-in completion message including the order ID is transmitted from the opening/closing control device 2 to the operation management server 3 via the communication network NW.

The operation management server 3 issues a return command to the UGV 1 in response to the carrying-in completion notice from the opening/closing control device 2 (step S23). The UGV 1 returns to the delivery source according to the movement control by the control unit 15 in response to the return command from the operation management server 3 (step S24). Moreover, the operation management server 3 issues a delivery completion notice of the article Co to the delivery management server 4 (step S25). In the delivery completion notice, a delivery completion message including the order ID is transmitted from the operation management server 3 to the delivery management server 4 via the communication network NW.

The delivery management server 4 updates the delivery status associated with the order information including the received order ID to delivery completion in response to the delivery completion notice from the operation management server 3 (step S26). Next, the delivery management server 4 issues a delivery completion notice of the article Co to the recipient of the article Co (step S27). In this delivery completion notice, for example, a delivery completion mail (or short mail) including the order information is sent to the e-mail address (or telephone number) of the recipient of the article Co and is received by the terminal of the recipient.

As described above, according to the above-described embodiment, it is configured such that the delivery system S performs the authenticating process of authenticating the UGV 1 in a case where the UGV 1 arrives at the delivery destination and performs the opening/closing control of the carry-in port IN1 from which the article Co is carried in at the delivery destination on the basis of the authentication result of the UGV 1, so that it is possible to deliver the article Co to the delivery destination by the UGV 1 while ensuring the security. Namely, in a case where the authentication of the UGV 1 is successful, the carry-in port IN1 opens to allow the article Co to be carried in, so that it is possible to prevent access to the inside of the delivery destination (for example, home) by the unmanned mobile vehicle or person not intended by the recipient of the article.

Further, according to the above-described embodiment, the delivery system S is configured to perform the authenticating process of authenticating the UGV 1 and carry the article Co in from the carry-in port IN1 opened by the opening/closing control based on the authentication result of the UGV 1 as the first step, and perform the authenticating process of authenticating the carried-in article Co and perform the opening/closing control of the carry-in port IN2 from which the carried in article Co is further carried in on the basis of the authentication result of the article Co as a second step, so that it is possible to further improve the security when the article Co is carried in from the carry-in port IN2 through the carry-in port IN1 (for example, when the article Co is completely carried in the home).

(Variation)

In the operation example illustrated in FIG. 11, in a case where the article Co is not the product ordered by the recipient on the EC site (for example, in a case of a package arranged for delivery by a person other than the recipient and the like), it is possible that the article ID obtained from the article Co does not coincide with the article ID managed by the delivery management server 4, and as a result, the authentication of the article Co is failed at step S16 described above. However, in this case, it is conceivable that the recipient permits the receipt of the article Co, so that a countermeasure thereof is described below with reference to FIG. 12.

Figure 12:
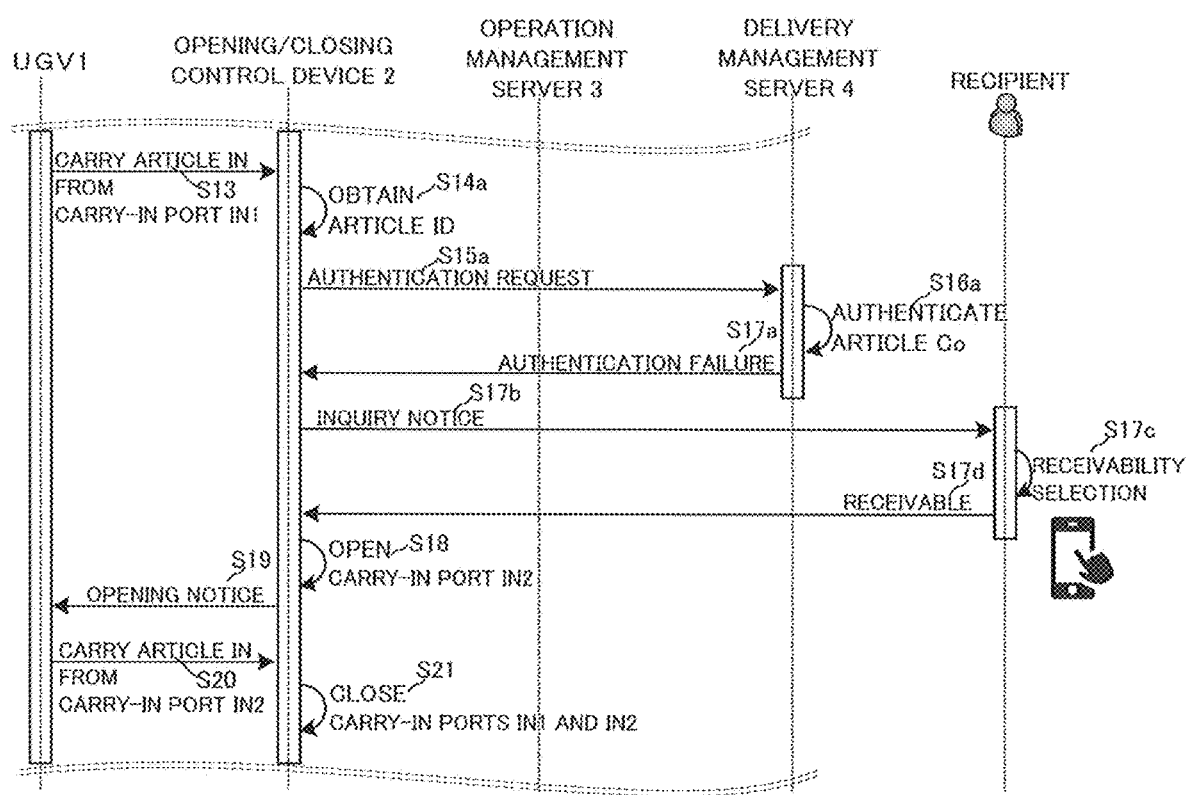
FIG. 12 is a sequence diagram illustrating a variation of operation of a delivery system S in a case where an authentication result of an article Co is authentication failure at step S16 illustrated in FIG. 11.

FIG. 12 is a sequence diagram (partially cited from FIG. 11) illustrating a variation of operation of a delivery system S in a case where an authentication result of an article Co is authentication failure at step S16 illustrated in FIG. 11. Incidentally, in FIG. 12, steps S1 to S13 are performed in a manner similar to that of the operation illustrated in FIG. 11. Then, an article ID is obtained from the article Co carried in from a carry-in port IN1 via a sensor Se2 (step S14a), and an authentication request including the article TD is transmitted to a delivery management server 4 (step S15a). The delivery management server 4 performs an authenticating process of authenticating the article Co in response to the authentication request from an opening/closing control device 2 (step S16a). Then, the delivery management server 4 determines that the authentication of the article Co is failed in a case where the article ID that coincides with the article ID included in the authentication request is not registered in a delivery information database 421 and transmits the authentication result indicating the authentication failure to the opening/closing control device 2 (step S17a).

When the opening/closing control device 2 receives the authentication result indicating the authentication failure from the delivery management server 4, this issues an inquiry notice of receivability of the article Co to a recipient of the article Co (step S17b). In this inquiry notice, for example, an inquiry mail (or short mail) in which information such as a name and contact information of a delivery client (that is, a person who makes delivery arrangement) is sent to an e-mail address (or telephone number) of the recipient of the article Co. Herein, the information of the delivery client is registered in advance in the delivery information database 421 together with delivery destination information, for example. Such inquiry mail is received by the terminal of the recipient of the article Co, and a permission button for selecting that the article Co may be received is displayed on a display of the terminal together with the information of the delivery client. The recipient checks the information of the delivery client, and if there is no problem, selects (for example, clicks) the permission button displayed on the display of the terminal. When the permission button is selected by the recipient in this manner (step S17c), the terminal transmits receivability information indicating that it is possible to receive (reception OK) selected by the recipient to the opening/closing control device 2 (step S17d). When the opening/closing control device 2 receives the receivability information indicating that it is possible to receive from the terminal of the recipient, this opens a carry-in port IN2 according to opening/closing control by the control unit 26 (step S18). According to such configuration of the variation, even if the article Co is not recognized by the recipient, it is possible to carry the article Co in from the carry-in port IN2 according to the permission of the recipient to complete the delivery, so that it is possible to improve efficiency of article delivery (in other words, to prevent wasteful article delivery). Incidentally, the processes after step S19 are similar to those in FIG. 11.

Incidentally, it should be noted that the foregoing embodiment is one embodiment of the present invention and does not limit the present invention accordingly; and any change, addition, or modification of the foregoing embodiment appropriately made within the spirit of the present invention will naturally fall within the technical scope of the present invention. For example, in the above-described embodiment, the example is described in which the authenticating process of authenticating at least any one of the UGV 1 and the article Co delivered by the UGV 1 is performed by the opening/closing control device 2 (or the operation management server 3 and the delivery management server 4); however, the authenticating process may also be performed by the UGV 1. Moreover, although the example is described in which the opening/closing control of the carry-in port IN1 is performed on the basis of the authentication result of the UGV 1 in the above-described embodiment, but it is possible to perform the opening/closing control of the carry-in port IN1 on the basis of the authentication result of the article Co. In this case, for example, the UGV 1 obtains the article ID from the article Co loaded into the UGV 1 (for example, obtains by the internal sensor of the UGV 1), and in a case where the UGV 1 arrives at the delivery destination, this transmits the above-described article ID to the opening/closing control device 2 via the short-range wireless communication. Then, the opening/closing control device 2 performs the authenticating process of authenticating the article Co using the article ID obtained from the UGV 1 and performs the opening/closing control of the carry-in port IN1 on the basis of the authentication result of the article Co. Alternatively, the opening/closing control of the carry-in port IN1 may be performed on the basis of both the authentication result of the UGV1 and the authentication result of the article Co. In this case, only in a case where the authentication of the UGV1 is successful and the authentication of the article Co is successful, the carry-in port IN1 is opened and the article Co is carried in.

Moreover, the present technology is also applicable to a delivery system that carries in a storage dedicated to a delivery, such as a so-called home delivery box. However, in the storage dedicated to the delivery, especially a storage partitioned for each delivery, the delivery is carried in an empty space, so that high security is not so much required at the time of carrying-in. In contrast, as in the above-described embodiment, in a case where an article is carried in through an opening that enables access from the outside to the inside of a space not dedicated to the delivery (that is, the inside of the building or the room), high security is required. Therefore, by applying the present technology to the delivery system that carries the article in through the opening that enables the access from the outside to the inside of the space not dedicated to the delivery, a remarkable effect may be obtained from the viewpoint of security.

Moreover, the above-described embodiment is applicable to any unmanned mobile vehicle in addition to the UGV 1 as long as the article Co may be transported unmanned to the delivery destination. For example, in the above-described embodiment, an unmanned aerial vehicle (UAV) that flies unmanned in the atmosphere to the delivery destination may be applied in place of the UGV 1. When the unmanned aerial vehicle in this case arrives at the delivery destination, this lands while controlling the movement (flight) so as to come close to the carry-in port IN1, and performs the carrying-in control of carrying the article Co loaded into the unmanned aerial vehicle in from the carry-in port IN1 opened on the basis of the authentication result of at least any one of the unmanned aerial vehicle and the article Co.

REFERENCE SIGNS LIST

1 UGV
2 Opening/closing control device
3 Operation management server
4 Delivery management server
11 Drive unit
12 Positioning unit
13 Radio communication unit
14 Imaging unit
15 Control unit
21,22 IF unit
23 Communication unit
24 Proximity detection unit
25 Authenticating processing unit 26 Control unit
31 Communication unit
32 Storage unit
33 Information processing unit
41 Communication unit
42 Storage unit
43 Information processing unit
NW Communication network

The invention claimed is:

1. A delivery system including an unmanned mobile vehicle configured to deliver an article to a delivery destination, the delivery system comprising:
   at least one memory configured to store program code; and
   at least one processor configured to access the program code and operate as instructed by the program code, the program code including:
   authenticating processing code configured to cause at least one of the at least one processor to perform a process of authenticating at least any one of the unmanned mobile vehicle and the article delivered by the unmanned mobile vehicle in a case where the unmanned mobile vehicle arrives at the delivery destination; and
   opening/closing control code configured to cause at least one of the at least one processor to perform opening/closing control of a first carry-in port from which the article is carried in at the delivery destination on the basis of an authentication result of at least any one of the unmanned mobile vehicle and the article, wherein the authenticating processing code causes at least one of the at least one processor to perform the process of authenticating the unmanned mobile vehicle as a first authentication step; and
   carrying-in control code configured to cause at least one of the at least one processor to perform carrying-in control of carrying the article in from the first carry-in port opened by the opening/closing control on the basis of the authentication result of the unmanned mobile vehicle,
   wherein the authenticating processing code causes at least one of the at least one processor to perform the process of authenticating the article carried in from the first carry-in port by the carrying-in control as a second authentication step, and
   the opening/closing control code causes at least one of the at least one processor to perform opening/closing control of a second carry-in port from which the article carried in from the first carry-in port is further carried in on the basis of the authentication result of the article.

2. The delivery system according to claim 1,
   wherein the authenticating processing code causes at least one of the at least one processor to perform the process of authenticating the unmanned mobile vehicle in a case where the unmanned mobile vehicle arrives at the delivery destination, and
   the opening/closing control code causes at least one of the at least one processor to perform the opening/closing control of the first carry-in port from which the article is carried in at the delivery destination on the basis of the authentication result of the unmanned mobile vehicle.

3. The delivery system according to claim 1, the program code further including
   detection code configured to cause at least one of the at least one processor to detect a state in which the unmanned mobile vehicle is close to the first carry-in port,
   wherein the authenticating processing code causes at least one of the at least one processor to performs the process of authenticating the unmanned mobile vehicle only in a case where a detection unit detects the state in which the unmanned mobile vehicle and the first carry-in port are close to each other.

4. The delivery system according to claim 1, the program code further including
   detection code configured to cause at least one of the at least one processor to detect a state in which the unmanned mobile vehicle is close to the first carry-in port,
   wherein the authenticating processing code causes at least one of the at least one processor to determine that the authentication result is authentication failure in a case of performing the process of authenticating the unmanned mobile vehicle when a detection unit does not detect the state in which the unmanned mobile vehicle and the first carry-in port are close to each other.

5. The delivery system according to claim 1,
   wherein a sensor configured to obtain information used for authenticating the article from the article carried in from the first carry-in port is provided between the first carry-in port and the second carry-in port.

6. The delivery system according to claim 1, the program code further including
   return control code configured to cause at least one of the at least one processor to perform return control of returning the article carried in from the first carry-in port by the carrying-in control to the unmanned mobile vehicle in a case where the authentication result of the article is authentication failure.

7. The delivery system according to claim 1, the program code further including:
   notice processing code configured to cause at least one of the at least one processor to issue an inquiry notice of receivability of the article to a recipient of the article in a case where the authentication result of the article is authentication failure; and
   receivability information reception code configured to cause at least one of the at least one processor to receive receivability information indicating the receivability selected by the recipient in response to the inquiry notice from a terminal of the recipient,
   wherein the opening/closing control code causes at least one of the at least one processor to perform the opening/closing control of the second carry-in port on the basis of the receivability information received by the receivability information reception code.

8. The delivery system according to claim 1, further comprising:
   a sensor configured to obtain information used for authenticating the article from the article delivered to the delivery destination by the unmanned mobile vehicle; and
   the program code further including
   order information management code configured to cause at least one of the at least one processor to manage order information of the article ordered for purchase,
   wherein the authenticating processing code causes at least one of the at least one processor to perform the process of authenticating the article using the information obtained by the sensor and the order information managed by the order information management code.

9. The delivery system according to claim 1, wherein the first carry-in port is provided at a boundary between an outside and an inside of a building or at a boundary between an outside and an inside of a room in the building, and serves as an opening enabling access from the outside to the inside.

10. The delivery system according to claim 1, wherein the delivery destination is at least any one of housing, an office, each section of collective housing, and each guest room of an accommodation facility.

11. A delivery method executed by a delivery system including an unmanned mobile vehicle that delivers an article to a delivery destination, the delivery method including:

performing a process of authenticating at least any one of the unmanned mobile vehicle and the article delivered by the unmanned mobile vehicle in a case where the unmanned mobile vehicle arrives at the delivery destination, wherein the process of authenticating the unmanned mobile vehicle is performed as a first authentication step; and performing opening/closing control of a first carry-in port from which the article is carried in at the delivery destination on the basis of an authentication result of the unmanned mobile vehicle or the article, performing carrying-in control of carrying the article in from the first carry-in port opened by the opening/closing control on the basis of the authentication result of the unmanned mobile vehicle, performing the process of authenticating the article carried in from the first carry-in port by the carrying-in control as a second authentication step, and performing opening/closing control of a second carry-in port from which the article carried in from the first carry-in port is further carried in on the basis of the authentication result of the article.

12. A control device provided on an unmanned mobile vehicle, the control device comprising:

at least one memory configured to store program code; and at least one processor configured to access the program code and operate as instructed by the program code, the program code including:

authenticating processing code configured to cause at least one of the at least one processor to perform a process of authenticating the unmanned mobile vehicle as a first authentication step;

movement control code configured to cause at least one of the at least one processor to perform movement control of moving the unmanned mobile vehicle to a delivery destination of an article; and carrying-in control code configured to cause at least one of the at least one processor to performs carrying-in control of carrying the article in from a first carry-in port opened on the basis of an authentication result of the unmanned mobile vehicle that arrives at the delivery destination, wherein the authenticating processing code causes at least one of the at least one processor to perform the process of authenticating the article carried in from the first carry-in port by the carrying-in control as a second authentication step, and the opening/closing control code causes at least one of the at least one processor to perform opening/closing control of a second carry-in port from which the article carried in from the first carry-in port is further carried in on the basis of the authentication result of the article.

13. The control device according to claim 12, wherein the movement control code causes at least one of the at least one processor to perform the movement control such that the unmanned mobile vehicle that arrives at the delivery destination comes close to the first carry-in port and a carry-out port and the first carry-in port face each other, the carry-out port being provided on the unmanned mobile vehicle.

14. A control method executed by a computer provided on an unmanned mobile vehicle, the control method including:

performing movement control of moving the unmanned mobile vehicle to a delivery destination of an article; and performing a process of authenticating the unmanned mobile vehicle as a first authentication step;

performing carrying-in control of carrying the article in from a first carry-in port opened on the basis of the authentication result of the unmanned mobile vehicle, performing a process of authenticating the article carried in from the first carry-in port as a second authentication step, and performing opening/closing control of a second carry-in port from which the article carried in from the first carry-in port is further carried in on the basis of the authentication result of the article.

* * * * *